(12) United States Patent
Lingier et al.

(10) Patent No.: US 11,801,672 B2
(45) Date of Patent: *Oct. 31, 2023

(54) INSPECTION DEVICE AND METHOD FOR INSPECTING AN ADHESIVE PATTERN ON A SUBSTRATE

(71) Applicant: NORDSON CORPORATION, Westlake, OH (US)

(72) Inventors: Eric Lingier, Straelen (DE); Alexander Wilhelm, Dusseldorf (DE)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,981

(22) Filed: Nov. 22, 2022

(65) Prior Publication Data

US 2023/0084543 A1 Mar. 16, 2023

Related U.S. Application Data

(63) Continuation of application No. 15/632,334, filed on Jun. 24, 2017, now Pat. No. 11,511,531.

(30) Foreign Application Priority Data

Jul. 4, 2016 (DE) .......................... 202016103570.8

(51) Int. Cl.
*B32B 41/00* (2006.01)
*B32B 37/12* (2006.01)
(Continued)

(52) U.S. Cl.
CPC ...... *B32B 37/1292* (2013.01); *B05C 11/1005* (2013.01); *B05C 21/00* (2013.01);
(Continued)

(58) Field of Classification Search
CPC . B32B 37/1292; B05C 11/1005; B05C 21/00; B05C 5/0212; C09J 7/22;
(Continued)

(56) References Cited

U.S. PATENT DOCUMENTS 4,704,603 A 11/1987 Edwards et al.
5,894,126 A 4/1999 Pompei et al.
(Continued)

FOREIGN PATENT DOCUMENTS

CN 1495748 A 5/2004
CN 101042296 A 9/2007
(Continued)

OTHER PUBLICATIONS

European search report dated Oct. 23, 2017 for EP Application No. 17179572.
HD-100 Hot Melt Sensor—Customer Product Manual, Sep. 20, 2013.

*Primary Examiner* — Michael N Orlando
*Assistant Examiner* — Joshel Rivera
(74) *Attorney, Agent, or Firm* — BakerHostetler

(57) ABSTRACT

Inspection devices and methods for inspecting an adhesive pattern on a substrate are disclosed. The inspection device includes at least one sensor having a heat sensor head for detecting a pattern of the adhesive bead, and a controller. Reference data representing a desired adhesive pattern is initially provided to a controller. A predetermined tolerance range for the desired adhesive pattern is also provided to the controller. An adhesive bead is discharged onto a substrate from a nozzle. A pattern of the discharged adhesive bead is then detected by the sensor when the substrate moves. Signals representing the detected pattern are received from the sensor at the controller. Finally, the signals representing (Continued)

the detected adhesive pattern are compared to the tolerance range of the desired adhesive pattern.

20 Claims, 14 Drawing Sheets

(51) Int. Cl.
  *B05C 21/00* (2006.01)
  *B05C 11/10* (2006.01)
  *G01B 11/04* (2006.01)
  *G01B 11/24* (2006.01)
  *C09J 7/38* (2018.01)
  *C09J 7/22* (2018.01)
  *B05C 5/02* (2006.01)
  *G01P 3/68* (2006.01)

(52) U.S. Cl.
  CPC . *C09J 7/22* (2018.01); *C09J 7/38* (2018.01); *G01B 11/04* (2013.01); *G01B 11/24* (2013.01); *B05C 5/0212* (2013.01); *G01P 3/68* (2013.01); *H05B 2203/021* (2013.01)

(58) Field of Classification Search
  CPC . C09J 7/38; G01B 11/04; G01B 11/24; G01P 3/68; H05B 2203/021
  USPC ................ 156/60, 64, 350, 351, 378, 379
  See application file for complete search history.

(56) References Cited

U.S. PATENT DOCUMENTS

| | | |
|---|---|---|
| 7,112,246 B2 | 9/2006 | Schucker |
| 11,511,531 B2* | 11/2022 | Lingier .................. B05C 21/00 |
| 2004/0194700 A1 | 10/2004 | Estelle |
| 2005/0041723 A1* | 2/2005 | Heerdt .................. G01J 5/0022 374/129 |
| 2005/0244569 A1* | 11/2005 | Estelle .................. B05B 12/084 427/8 |
| 2007/0223805 A1 | 9/2007 | Jeon et al. |
| 2012/0164348 A1 | 6/2012 | Zimmermann et al. |
| 2012/0229814 A1 | 9/2012 | Freimann et al. |
| 2014/0138400 A1* | 5/2014 | Donner ............... B05C 11/1013 222/23 |

FOREIGN PATENT DOCUMENTS

| | | |
|---|---|---|
| CN | 101642744 A | 2/2010 |
| CN | 102686972 A | 9/2012 |
| CN | 104812500 A | 7/2015 |
| CN | 107411209 A | 12/2017 |
| DE | 19520190 A1 | 2/1996 |
| DE | 10048749 A1 | 4/2002 |
| DE | 19549545 C2 | 8/2002 |
| DE | 10257567 A1 | 7/2004 |
| DE | 102004021573 A1 | 12/2005 |
| DE | 102009023403 A1 | 12/2010 |
| EP | 2638978 A1 | 9/2013 |
| GB | 2289941 A | 12/1995 |
| JP | 63-044134 A | 2/1988 |
| JP | 08-313222 A | 11/1996 |
| JP | 2002-192033 A | 7/2002 |
| JP | 2009-010520 A | 1/2009 |

* cited by examiner

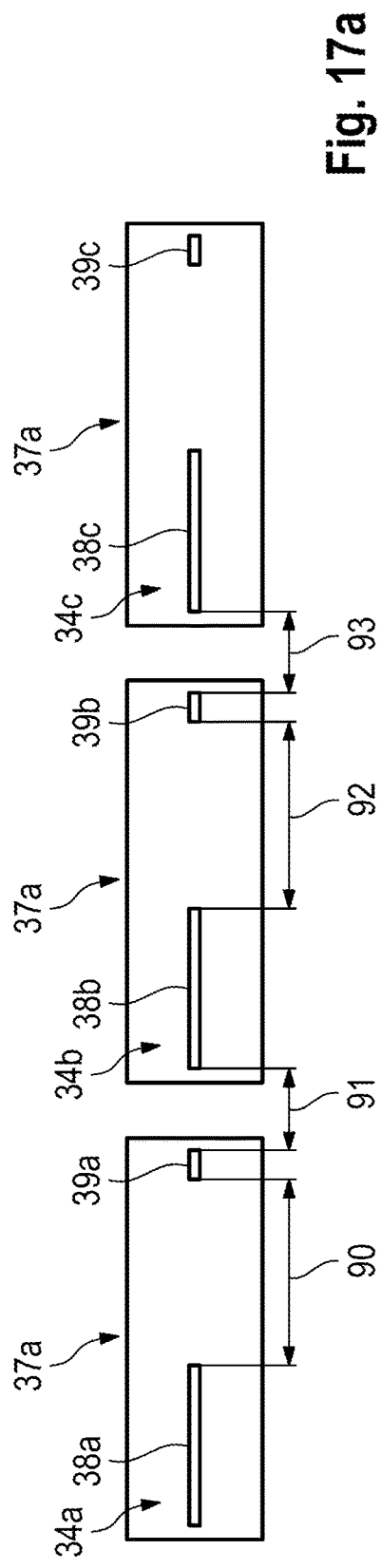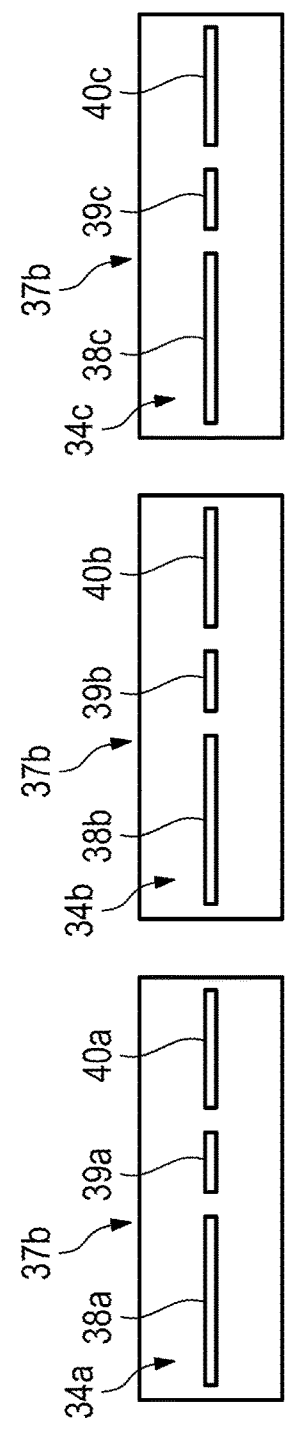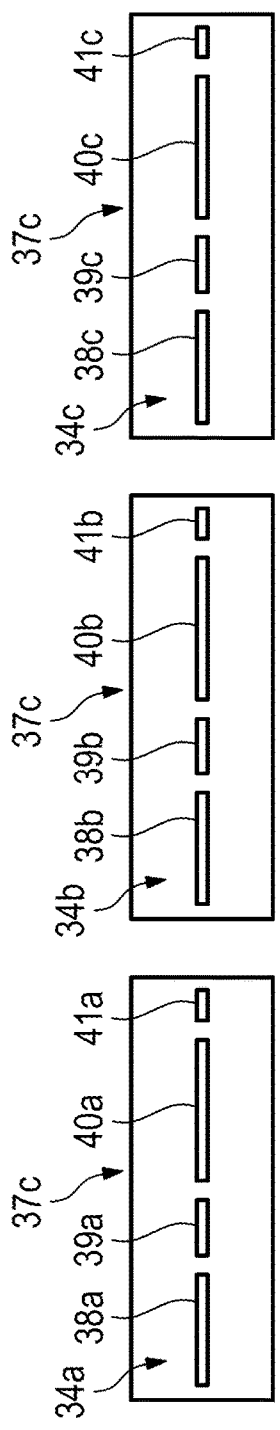

INSPECTION DEVICE AND METHOD FOR INSPECTING AN ADHESIVE PATTERN ON A SUBSTRATE

CROSS-REFERENCE TO RELATED APPLICATION

This application is a continuation of U.S. patent application Ser. No. 15/632,334, filed Jun. 24, 2017, which claims priority to foreign German Patent App. No. DE 202016103570.8, filed Jul. 4, 2016, the entire disclosures of both of which are hereby incorporated by reference as if set forth in their entirety herein.

FIELD OF THE INVENTION

The invention relates to a method for inspecting an adhesive pattern on a substrate. Moreover, the invention relates to an inspection device for inspecting an adhesive pattern on a substrate. The invention further relates to an applicator head comprising a basic body, a nozzle for discharging an adhesive and an inspection device of the aforementioned art.

BACKGROUND

Adhesive patterns are discharged from applicator heads and deposited on substrates for various reasons. In particular in the packaging industry adhesive patterns are deposited on a substrate in order to produce packaging materials. Specific examples of such packaging materials are plastic boards or fibre cardboard. The packaging materials are fed typically into a machine as substantially flat elements (also referred in the following as substrates). The fluid, mostly hot-melt adhesive, is then applied along one or more tracks on various areas of the substrate in a process for discharging a fluid by means of an applicator head. After application of adhesive, the packaging materials are either filled with a product or remain empty. The areas to which an adhesive was previously applied are then folded along defined edges and pressed onto corresponding areas. The applied adhesive causes the areas to adhere to each other.

The application described above is for mass production, so in addition to increasing efficient use of time efforts to make improvements are also centered at all times on reducing the amount of material needed for production.

Therefore it is known to apply a pattern of intermittent, short-pulsed segments of adhesive onto substrates, rather than applying continuous beads of adhesive, in order to provide an adequate adhesive effect while using a reduced amount of fluid or adhesive.

From EP 2 638 978 A1 a method is known for transforming a primary discharge signal for controlling an applicator head into a secondary discharge signal, the secondary discharge signal having a plurality of successive, spaced-apart signal portions which are each determined as part of the length of the primary signal, and whose total length is less than the length of the primary signal. Using such a method, a primary discharge sig, which e.g. may indicate a continuous adhesive bead, is transformed into a so-called "stitched" signal for stitching an adhesive pattern, consisting of a plurality of successive, spaced-apart bead portions.

Performing such methods, the operation moves closer to the limit and the need to verify that the correct amount of adhesive is applied becomes more and more important. Shipping products that are defective due to incorrect adhesive application needs to be prevented, to avoid costly returns and reputation damage. Today, adhesive verification can only be accomplished using complex and expensive systems that are not easily integrated and not well suited for the requirements of the packaging market, in particular in terms of space, short time to integrate in existing systems and ease of use. The systems must be set up for each application and must be programmed for each new pattern, whereby changes in machine speed can already cause false detection and inspection of an adhesive pattern.

SUMMARY OF THE INVENTION

Therefore, it is an object of the invention to provide an inspection method and a device for carrying out such method, which solves at least some of the above-mentioned problems and is simple, less complex, easy to use and can be used with existing machines.

In a first aspect of the invention, the object is achieved with a method of the type initially specified, comprising the steps of: providing reference data representing a desired adhesive pattern into a controller; providing a stored and pre-determined tolerance range for the desired adhesive pattern in the controller; discharging an adhesive bead onto a substrate from a nozzle; detecting a pattern of the discharged adhesive bead on the substrate when the substrate moves by means of a sensor arrangement; receiving signals representing the detected pattern from the sensor arrangement at the controller; and comparing said signals representing the detected adhesive pattern with the tolerance range of the desired adhesive pattern.

The invention is based on the idea that when lesser and lesser adhesive is used for a substrate for gluing the substrate to another surface, it is not sufficient to only control a discharge nozzle accordingly by means of a feed-forward signal, but that it is necessary to inspect the adhesive pattern discharged onto the substrate. The invention makes use of the idea that it is beneficial to inspect the discharged pattern directly after application and not at the end of the process, when e.g. the packaging is already folded and edges are adhered together.

The core idea of the invention is that the detection method can be used standalone and that no teach button is necessary for teaching a desired adhesive pattern. The method preferably is carried out by means of an inspection device of the second aspect of the invention. The method is based on the idea that the desired adhesive pattern is the pattern that is discharged on the substrate in the target state under nominal condition. This desired adhesive pattern which the sensor arrangement should detect in the target state, is stored in the controller. Moreover, a predetermined tolerance range for the desired adhesive pattern is stored in the controller. When the pattern of the discharged adhesive bead is detected, signals, output by the sensor arrangement, representing this detected pattern, are compared to the tolerance range of the respective desired adhesive pattern by means of the controller. When it is determined that the detected adhesive pattern is within this tolerance range, the detected adhesive pattern is identified to be congruent with the desired adhesive pattern.

Congruent in this instance means, that the pattern is within predefined tolerances, which may be set manually or which may be determined by means of a controller based on process parameters. Preferably the method is carried out using an inspection device according to at least one of the below explained preferred embodiments of an inspection device according to the second aspect of the invention. It shall be understood that the inspection device of the second aspect of the invention and the method of the first aspect of the invention comprise identical and similar features which are in particular defined in the dependent claims. In so far, reference is made to the below description of the second aspect of the invention regarding the inspection device.

In particular, the length of the adhesive pattern, and/or the length of single beads of the adhesive pattern are determined and compared to a desired length of the pattern and/or a desired length of single beads of the adhesive pattern. The length of the adhesive pattern is measured in the machine direction, i.e. the travelling direction of the substrate. In general, there are different possibilities of determining the length. On the one hand, it is preferred to determine, by measuring and/or calculating, a cumulative length of the discharged adhesive pattern, that is the cumulative length of all beads and bead portions of the discharged adhesive pattern. On the other hand, it is also possible to measure the overall length, i.e. the length from the leading edge of the first bead of the pattern until the trailing edge of the last bead of the pattern. Moreover, it is also possible to determine, by measuring and/or calculating, pre or post pattern, which is the length of a bead that extends beyond the desired leading edge of a desired adhesive pattern and/or the trailing edge of a desired adhesive pattern. All these measurements and/or determinations are preferred and carried out with the present invention.

According to a first preferred embodiment, the predetermined tolerance range of the desired adhesive pattern is calculated using pre-stored typical values for a specific application case. In general, dispensing apparatus are designed and setup for a specific application case by a customer and for these typical application cases, typical values are known representing typical and acceptable deviations from a desired adhesive pattern. For example it is known which level of thermal radiation a bead produces, when it is discharged with 140, 150 or 160° C. and having a 3 mm width, for example. Such values can be used to calculate the predetermined tolerance range for a thermal radiation of the desired adhesive bead. Moreover, for example, nozzle opening and closing reaction times in typical operating conditions for specific dispensers, as e.g. the MiniBlue SP solenoid of Nordson Corporation, are experimentally determined and thus known. Such a range of reaction times also can be used to calculate the tolerance range. An example calculation could then be calculating a tolerance range of +/−2 mm in bead length at an application speed of 60 m/min given a known range of open and close reaction times of 2 ms.

Moreover, it is optional to calculate the predetermined tolerance range using pre-sensed values of an exemplary application case. These pre-sensed values are not necessarily pre-sensed by the manufacturer of the dispensing apparatus or inspection device, but also can be pre-sensed by an operator when adjusting the device for an application case. For example, under known conditions specific patterns are discharged which are manually determined to be acceptable and thus congruent with a desired adhesive pattern. The values sensed in these cases can be used for calculating the predetermined tolerance range. For example, mean values that are sensed in three samples are used to calculate the average of the three discharge patterns. This average value can be used to set a new desired adhesive pattern and the predetermined tolerance range can be set for example to 4.9 msec+/−5%.

It is preferred that, the step of detecting a pattern of the adhesive bead is carried out by detecting irradiated heat of the adhesive bead. Thus, the pattern is detected in a contactless manner and not based on visual inspection methods, but using radiation wavelengths which are in a non-visual range.

In a further preferred embodiment the pre-stored and/or pre-sensed values comprise at least one signal strength value, representing threshold values for expected signals detected by said sensor arrangement when detecting the pattern of the discharged adhesive bead. In particular when using infrared sensors for the sensor arrangement, these sensors detect a specific infrared radiation all the time. When a bead is detected, the radiation increases rapidly, since the bead usually is discharged with a heat around 150° C. and as such the signal strength rapidly increases, when a discharge bead is detected.

It shall be understood that the term "signal" may also refer to derivatives of signals or higher order derivatives, and is not limited to the original source single itself.

In a particular preferred embodiment detecting the pattern of the discharged adhesive bead comprises the steps: determining by the controller an intensity or rate of change in intensity of a value sensed by the sensor arrangement; comparing by the controller the intensity or rate of change in intensity with the signal strength rate of change value or intensity or a respective threshold value stored in the controller; and determining by the controller that a bead edge is present, when the intensity or rate of change in intensity signal exceeds the threshold value stored in the controller. When a substrate having a discharged adhesive pattern thereon approaches the sensor arrangement, the signal strength measured by the sensor arrangement increases. Preferably, the rate of change of this changing signal intensity is determined and compared with a pre-stored rate of change value. The pre-stored rate of change value is provided with a tolerance range. When the rate of change determined by the controller based on the detected changing intensity value is within this tolerance range, a bead edge is detected. When the value is increasing, it is indicative for a leading edge of a bead and when the value is decreasing, it is indicative for a trailing edge of a bead.

Preferably, the signal strength rate of change value or the respective threshold value is scaled by the controller in dependency of a velocity of the substrate and/or in dependency of a cooling rate factor. The cooling rate of the discharged adhesive is dependent on the environmental temperature, air flow, and heat capacity of the discharged adhesive. When the adhesive is discharged with a low temperature or the environmental temperature is high, the rate of change of the sensed infrared radiation when the substrate is approaching the sensor arrangement is lower than in cases in which the adhesive is discharged with a high temperature. Therefore, the rate of change value preferably is scaled. The same is true for the velocity of the substrate. When the velocity of the substrate is high, the rate of change of the intensity measured by the sensor arrangement also is high. Thus, it is preferred to scale the pre-stored rate of change value or the predetermined tolerance range for this value. This can be done automatically based on known relationships between these values.

In a preferred embodiment the rate of change intensity signal is passed through a low, high and/or bandpass filter for preventing intensity changes caused by sensor noise or environmental conditions which occur at rates atypical for the start/end of an adhesive bead from leading to false positive edge detection. This increases robustness of the method.

According to a further preferred embodiment the method comprises the steps: determining by the controller a travelling speed and edge position of the substrate, wherein determining the travelling speed and edge position of the substrate is carried out using a speed sensor of the sensor arrangement, comprising the steps: determining by the controller a rate of change in intensity of a value sensed by the speed sensor; comparing by the controller the rate of change in intensity with a pre-stored threshold in the controller; and determining by the controller that a substrate edge is present when the rate of change in intensity exceeds the threshold. This can be done by means of two infrared sensors which detect the same bead and which are offset in machine direction to each other. When the offset in machine direction of these two infrared sensors is known, the travelling speed of the substrate can be determined. Alternatively, the speed sensor comprises two photo cells which detect the substrate edge by evaluating the received light radiation. Preferably, the time laps between detection of the edge at the first photo cell and the second photo cell is determined and when the distance between the photo cells in machine direction is known, the speed can be calculated. The substrate is considered present until the following edge is detected, and an additional speed measurement can be taken at this edge and used together with the first to give a more accurate average velocity over the course of the substrate length.

Alternatively or additionally, the method comprises the step: determining the travelling speed of the substrate comprising detecting a bead, in particular a leading edge of a bead, at a first position with a first sensor head, detecting the bead, in particular the leading edge of the bead at a second position with a second sensor head, determining the time difference between the first and the second detection, calculating the travelling speed based on the time difference and the offset of the two sensor heads in moving direction.

Alternatively or additionally the travelling speed is determined using an optical detector, preferably at least two spaced apart receivers, i.e. photo cells, which is arranged to detect a leading and/or trailing edge of a substrate. Preferably, the detection of the leading and/or trailing edge of the substrate is carried out by detecting a rate of change in intensity detected by e.g. the photo cell. If this intensity exceeds a predetermined minimum value, it is considered a substrate edge. By comparing the time between detection at the first and second receivers, the speed of this edge can be calculated. The substrate is considered present until the following edge is detected. The predetermined minimum value may be pre-stored in a memory of the controller and may be derived on an experimental basis, using the actual manufacturing line set up and the actual environmental conditions. Due to such a method, a substrate speed measurement from a rotary encoder as it is known in the prior art is not necessary anymore.

In a further preferred embodiment of the invention, the method comprises the steps of: receiving a discharge signal from a control unit of a nozzle for discharging the adhesive; determining by the controller the desired pattern based on the received discharge signal. When the pattern of the discharge signal of the nozzle is known, this is a simple way to set a desired pattern. When the distance between the sensor and, the nozzle as well as the travelling speed of the substrate is known, it can be estimated at which times, and at which points, an adhesive bead should be detected. On the received discharge signal, which may be intercepted by the controller, predetermined tolerances, preferably at least in width and length direction, may be applied to determine the desired pattern. Due to such a method, a teach button as it was known in the prior art for teaching a desired pattern to a machine is not necessary anymore.

According to a further preferred embodiment the step of determining the desired pattern comprises the steps of: calculating a desired bead beginning time and bead end time, using at least one predetermined delay value pre-stored in the controller. When the discharge signal is known and/or intercepted, and furthermore the geometric relationship between the nozzle, the substrate and the inspection device, in particular the heat sensor or heat sensor heads are known, the desired adhesive pattern can be calculated and in particular the desired bead beginning time and bead end time can be calculated. The delay values in this instance are for example delay for a solenoid coil energization, delay for air flow into adhesive valve module, delay for adhesive flow out of a module at the nozzle tip, delay for adhesive flight from nozzle tip to substrate, delay for substrate travelling to sensor head. All these delay values should be included in the calculation, when the discharge signal is intercepted.

In a preferred embodiment the method further comprises the steps of: determining a background heat when no substrate is present, comparing by the controller the determined background heat with a heat detected when a substrate and/or bead is present. Preferably, the determined background heat is stored in a memory in the controller and the stored background heat is used when the adhesive pattern is detected. This allows that it is not necessary that the sensor arrangement needs to measure absolute heat values, much more it is sufficient to measure the rate of change, or a threshold between the background heat and the actual measured heat. Furthermore, a threshold heat can be determined using the background heat and when a heat above the threshold heat is measured, it is determined that an adhesive bead is present. When the threshold is reached, this position is detected as a start or an end of a bead, depending on if it is a rising or falling edge, as discussed above.

Preferably, the step of detecting the pattern of the adhesive bead comprises detecting a width of the bead. Such a width can be detected by using two or more infrared sensors arranged adjacent to each other perpendicular to the machine direction. Preferably, the tolerance range comprises a width tolerance, wherein the width tolerance is dependent on the travelling speed of the substrate. When the substrate moves faster, the bead normally will have a smaller width, when the discharge velocity is kept constant. Thus, also the tolerance preferably is scaled by the velocity and stored. This speed factor may be determined experimentally.

According to a further preferred embodiment the method comprises the steps: providing a centerline tolerance range for the desired adhesive pattern; calculating a centerline of the detected pattern; and comparing the calculated centerline with the centerline tolerance range. The centerline can be calculated, when the width of the discharge adhesive pattern is known. This centerline according to this embodiment is compared to a centerline tolerance range of the desired adhesive pattern. Due to these specific method steps, it can be determined whether an offset in a direction perpendicular to the machine direction of the discharged adhesive pattern is within the tolerance or not.

Moreover, it is preferred that the method comprises the step: calculating an area of the substrate which is covered by the bead. This area is called bead area. Knowing the length and the width of a bead, also the bead area can be calculated and it can be determined whether this bead area is within predetermined tolerance range of a bead area of the substrate. This helps to determine whether enough adhesive is discharged for satisfying a specific application requirement.

In a further preferred embodiment the method comprises the steps: providing a tolerance for a maximum gap between two beads of the desired adhesive pattern; calculating a gap between two beads of the detected pattern; and comparing the calculated gap with the tolerance for a maximum gap. Preferably, when the calculated gap is larger than the tolerance for the maximum gap, a fault signal is output. Such a measurement may be called Max Gap measurement. The idea is that there is a maximum distance or a gap allowed inside the adhesive pattern for still meeting the requirements of the process. This maximum distance is different for each application and also for each type of adhesive pattern that is used. Preferably, the method also comprises selecting between a high tolerance for a maximum gap between two beads of the desired adhesive pattern and a low tolerance for a maximum gap between two beads of the desired adhesive pattern. The high tolerance preferably is selected when it is acceptable that up to one internal bead of the adhesive pattern can be completely missing and a portion of another internal bead of the pattern can be missing from the pattern and still pass the Max Gap verification. The low tolerance for the maximum gap between two beads of the desired adhesive pattern is preferably selected when it is acceptable that there can be only a portion of a bead missing and still pass the Max Gap verification. Preferably, this measurement is not cumulative, so any bead that is detected restarts the beginning of the Max Gap measurement, until either the bead ends or there is a Max Gap failure.

In a further preferred embodiment, also a thermal intensity of the bead area is used as verification criteria. Thus, the method preferably comprises the steps: providing a tolerance for a thermal intensity value of the desired area; measuring or calculating a thermal intensity value of the calculated area of the substrate which is covered by the bead; and comparing the thermal intensity value of the calculated area with the tolerance for the thermal intensity value. Such a value can also be referred as intensity over area. This thermal intensity gives an indication whether the adhesive temperature, and/or the amount of discharged adhesive is correct for the desired adhesive bond application. In case the thermal intensity value is too high, it is indication that the temperature of the adhesive is too high and/or too much adhesive is discharged on the substrate. Since this value is dependent on the desired area of the substrate which is covered by adhesive, it is preferred that this area is measured and/or calculated in advance. In a further aspect of the invention or a preferred embodiment of the method, the above problem is solved by a method for inspecting an adhesive pattern on a substrate, comprising the steps of: providing a stored and pre-determined tolerance range for a desired adhesive pattern in a controller; receiving a discharge signal from a control unit of a nozzle for discharging the adhesive at the controller; determining by the controller the desired pattern based on the received discharge signal; receiving by the controller a change in the discharge signal and/or receiving by the controller a discharge signal for the first time; and setting the tolerance range for the desired pattern to a predetermined learning range. Preferably, the method comprises the steps of determining a change in the discharge signal and/or determining a discharge signal for the first time, and subsequently entering a learning mode. In such a learning mode, the step of setting a tolerance value for the desired pattern to a predetermined learning value is preferably carried out. When it is determined that a discharge signal no longer matches the previous discharge signal pattern, or a discharge signal is detected for the first time, e.g. when the method is carried out for the first time or the machine is started, the learning mode is entered. The learning mode, preferably, is active for a predefined number of patterns and/or for a predefined period of time. The learning mode is used to adapt or adjust the method and/or the inspection device of the second aspect describes below, in particular the controller of the inspection device, to a changed discharge signal automatically. Also in this particular embodiment it becomes apparent, that no teach button is required. Based on a change in the discharge signal and/or determining a discharge signal for the first time the learning mode is entered and not due to an operator pressing the teach button.

The size of the tolerance value in learning mode is preferably based on pre-stored values that correspond to pre-determined adhesive patterns, in particular based on experimental data of typical adhesive patterns. The learning tolerance value should be chosen such that the majority of discharged adhesive patterns are within the tolerance range during learning mode.

The method preferably further comprises the steps of: comparing a detected adhesive pattern with the previously detected adhesive pattern, and determining whether the deviation and/or the deviation rate between the detected pattern, since the change in the discharge signal and/or the discharge signal has been determined, is within a predefined tolerance. According to this embodiment, which in particular is useful when the learning mode is entered, the currently detected adhesive pattern is compared with the previously detected adhesive pattern. Preferably, the currently detected adhesive pattern is compared with two or more previously detected adhesives patterns, since a change in pattern has been determined and/or a learning mode has been entered. The deviation between the current and the previous pattern is determined. Additionally or alternatively, a deviation rate between the current pattern and the previously detected patterns is determined. After the deviation and/or the deviation rate has been determined, it is furthermore determined if this deviation and/or deviation rate is within a predefined tolerance. This allows checking whether the adhesive pattern detected cycles or converges so that a stable output is achieved. In case it is determined that the deviation and/or the deviation rate is not within the predefined tolerance, a pattern-fault signal may be outputted. Preferably, the number of previously discharged pattern which are analyzed is in the range of 2 to 10, preferably 2 to 5, preferably 3. Preferably the mean value of these last 3 discharged patterns is used.

In a further preferred embodiment, the method comprises the steps of: reaching a predetermined number of N−1 detected adhesive patterns since the change in the discharge signal and/or the discharge signal has been determined, using the N detected pattern as the desired pattern and/or evaluating the adhesive patterns until a predetermined number N+x and calculating a desired pattern based on at least some of the N to N+x detected adhesive patterns. Preferably N equals a number of the range 2 to 10, preferably 2 to 5, particularly preferred equals 3. Preferably x equals a number of the range 2 to 10, preferably 2 to 5, particularly preferred equals 3. These method steps are preferably carried out in the learning mode. When it is detected that the discharged adhesive pattern is a stable pattern and within predefined tolerances for a predefined number of N−1 times, the N detected pattern can be used as the desired pattern. Alternatively, the desired pattern can be calculated by using a plurality of at least two detected adhesive patterns within the learning mode, which are stable, i.e. their deviation and/or their deviation rate is within a predefined tolerance.

When the new desired pattern has been set, based on the previously described method steps, it is preferred that the tolerance range which has previously been changed to the predetermined learning tolerance range is set back to a predefined tolerance range. This tolerance range preferably is then centered around the calculated desired pattern. This pre-determined tolerance range can be identical to the tolerance range used before entering the learning mode or can be a different tolerance range, based on process parameters, as previously described. After the tolerance range has been set back from the pre-determined learning tolerance range, the learning mode is preferably exited. Subsequently, the method is further carried out in a normal working mode.

According to a further preferred embodiment of the method, the method comprises the step: outputting a pattern fault signal when the detected adhesive pattern is not within the tolerance range of the desired adhesive pattern. The pattern fault signal is output when the detected adhesive pattern is not congruent to the desired adhesive pattern.

In a further preferred embodiment the method comprises the steps of: receiving the pattern-fault signal at an alarm device; and outputting an alarm signal by means of the alarm device. Such an alarm device may include an alarm bell, or alarm light, so that an audio alarm or a visual alarm is provided to an operator.

Furthermore, it is preferred that alternatively or additionally the pattern-fault signal is received at a discard device and the discard device discarding the substrate having the fault adhesive pattern. The discard device may include an arm or pusher or the like mechanical member, which contacts the substrate having the faulty pattern for discarding the faulty substrate. By means of these steps, it can be assured that only substrates having a correct adhesive pattern are provided at the end of the production procedure.

The invention achieves its object in a second aspect with an inspection device of the kind initially specified, comprising at least one sensor arrangement having a heat sensor head for detecting a pattern of an adhesive bead on the substrate when the substrate moves along the heat sensor head; a housing for housing said heat sensor head, and a controller being connected to said sensor arrangement, the controller comprising: reference data representing a desired adhesive pattern; and a stored and pre-determined tolerance range for the desired adhesive pattern; wherein the controller is adapted to receive signals representing the pattern detected by the sensor arrangement and to compare said signals representing the detected adhesive pattern with the tolerance range of the desired adhesive pattern.

The controller preferably comprises storage means for the stored and predetermined tolerance range for the desired adhesive pattern and/or the reference data representing the desired adhesive pattern. The storage means may be formed as a RAM- or ROM-memory or a flash-memory. This embodiment is in particular preferred, when no other reference values are obtainable, or when the machine is in or short after start up. The stored values are preferably based on known typical adhesive patterns, and may be preset by the manufacturer and/or the operator. Both, the reference data representing the desired adhesive pattern and the tolerance range might be changed and adapted by an operator or due to the above described method.

Preferably, the heat sensor head is housed in a housing and the housing is adapted for attaching the heat sensor head in close proximity to a nozzle, from which the adhesive is discharged. The housing may comprise a mounting section or a mounting device, like clamping means or screws or corresponding screw-threaded bores for attaching the housing to the applicator head, e.g. an applicator body including the nozzle, or other parts of the applicator, such as the housing of the pneumatic solenoid valve. The housing may also be directly integrated into a main body of an adhesive applicator. The term close proximity in this instance refers to a distance between the nozzle opening and the heat sensor head preferably measured along the moving direction of the substrate. This distance preferably is in the range up to 5 cm, preferably in a range from 0.5 cm to 5 cm, more preferably 0.5 cm to 2.5 cm. A smaller distance saves space and leads to better results.

Furthermore, the inspection device according to the invention comprises a controller, being connected to the sensor arrangement. The controller preferably comprises software code for carrying out the method according to the first aspect of the invention.

The term "pattern" in this instance refers to a single bead, multiple bead portions, and specific arrangements of beads and bead portions on a single substrate and includes the position, shape and amount of adhesive beads. Despite this, "pattern detection" in this instance does not necessarily mean that all the before mentioned parameters are detected. It might, dependent on the embodiment, be sufficient to only detect one of these parameters or other parameters indicative for a bead. Normally, on each substrate, following one another, the same adhesive pattern is applied. It should be understood that the term "adhesive" in this instance refers to hot-melt adhesive, glue or any other liquid which may be applied heated for adhering substrates together, like e.g. sealants, fat or foamed materials.

In a first preferred embodiment, the heat sensor is a non-contact sensor. This allows the heat sensor head to be distant from the substrate and there is no need to contact the substrate and/or the adhesive pattern. Preferably the heat sensor head is in a range of 5 to 45 mm, preferably 5 to 15 mm, in particular 10 mm away from the substrate, preferably in a direction substantially perpendicular to the substrate surface.

Preferably the heat sensor head is an infrared sensor. With such an infrared sensor, non-contact measurement of heat emitting elements is impossible. The substrate usually is at ambient temperature and the adhesive is applied at elevated temperatures, in particular when a hot-melt adhesive is used. Hot-melt adhesive usually is applied at about 100° C. to more than 200° C. and therefore significantly distinct from the ambient temperature. According to the invention, digital as well as analogue thermopiles or thermocouples may be used.

According to a further preferred embodiment, the sensor arrangement is arranged in the housing which preferably provides a thermal insulation for insulating electronic parts of the heat sensor head and the sensor arrangement from the heat of the nozzle. This may reduce the space required for mounting the inspection device and also faster measurements can be carried out.

According to an alternative less preferred embodiment, the heat sensor head is connected to an infrared fibre and the heat sensor head is arranged distal from said nozzle. The heat sensor head in such an embodiment may comprise a lens or the like for coupling the infrared radiation of the adhesive pattern on the substrate into the infrared fibre. The infrared radiation is then transferred via the infrared fibre to the heat sensor head which may be arranged in safe distance from the nozzle, so that the heat sensor head is shielded against the heat radiation of the nozzle, to not negatively influence the detection of the adhesive pattern on the substrate. According to this embodiment, the housing may be kept with limited dimensions and may be easily connected in close relation to the nozzle, when it only houses the distal free end of the fibre. However, this embodiment requires infrared fibers to be guided to the sensor, which in certain embodiments and applications may not be desired.

According to a particularly preferred embodiment the inspection device comprises two or more heat sensor heads, which are arranged offset to each other in a direction substantially perpendicular to a direction of travel of said substrate for detecting a width and/or centerline position in the direction perpendicular to travel of said adhesive bead on said substrate. This direction would usually be referred to as the width direction of the substrate, perpendicular to the direction of travel (machine direction). Preferably, four or more heat sensor heads are arranged offset to each other. According to this embodiment, not only the width may be detected but also the offset of the bead from the desired centerline, perpendicular to the machine direction and/or multiple beads, running parallel to each other on one substrate may be detected. Furthermore, by measuring and/or comparing the intensity of the signal at each heat sensor head, interpolation can be used to obtain a more precise estimate of bead width and/or position, as heat sensor heads that see only part of the bead give lower signals than those whose field of view is filled entirely by bead. If heat sensor heads lying towards the edge of the array of heat sensor heads detect a stronger signal than those at its center the controller may detect that the middle of the bead lies outside the detection window. The heat sensor heads may be arranged in a row, substantially perpendicular to the machine direction of the substrate, or also offset to each other in the direction of travel.

According to a further preferred embodiment, the inspection device comprises two or more heat sensor heads, which are arranged offset to each other in a direction parallel to the machine direction of said substrate, for detecting a travelling speed of said substrate and/or a cooling rate of the adhesive bead. This direction will be usually referred as the length direction of the substrate. When two of the heat sensor heads are arranged offset in the length direction, the travelling speed can be determined in that when the offset of the two heat sensors is known, and the first heat sensor detects the adhesive bead at a first point of time and the second heat sensor sees the adhesive bead at a second point of time, the travelling speed can be calculated by the time difference between these two points of time. No encoder for calculating the speed based on other parameters is necessary. Additionally or alternatively a cooling rate of the adhesive bead can be determined in the same manner. According to this embodiment, the inspection device can determine the speed of the substrate and/or cooling rate of the adhesive bead itself, without any external encoder signal, as well as the position of the pattern relative to the substrate edge. This makes the inspection device easier to integrate into existing systems, without additional efforts of programming and wiring. Knowing the travelling speed of the substrate is important, because at slower speeds, the bead becomes wider than at faster speeds, when a discharge volume of adhesive per time stays constant. Furthermore, the travelling speed of the substrate determines the delay between when the adhesive is applied at the point below the nozzle and the bead reaching the sensor, which affects the time between the discharge signal of the nozzle and the sensor signal that are being compared for comparing the detected adhesive pattern with a desired adhesive pattern. Additionally, the travelling speed of the substrate also influences the time that the adhesive cools, if hot-melt adhesive is used, which affects the sensor reading and therefore signal quality. When additionally the cooling rate of the adhesive bead is determined, this value can be used to adjust a sensitivity of the heat sensors. The cooling rate may also be part of verification data and can be used as an indication of bond strength. The temperature of the adhesive plays a strong role in how well the adhesive connects with the material to be bonded.

In a further preferred embodiment, the inspection device comprises a mask for the at least one heat sensor head, for constraining a sensing area of the heat sensor head. The mask preferably is formed in such a manner, that a line of sight of the heat sensor head is present only between a specific predetermined width portion of the substrate and the heat sensor head. Due to the mask, it becomes possible to constrain or focus the heat sensor sharper to the specific sensing area, so that it is simple to determine which heat sensor head detects which bead or bead portion. It is particularly preferred, when two or more, or four or more, or even more heat sensor heads used. The mask preferably also shields a portion of the heat sensor head against heat radiation of the nozzle or other machine parts, which could negatively influence the operation of the sensor.

Furthermore it is preferred that the mask comprises one or more slots, forming sensor openings. The slots may be arranged in a width or a length direction i.e. perpendicular or parallel to a machine direction of the substrate. Preferably, slots which are arranged parallel to the machine direction of the substrate are provided for heat sensor heads used for a width measurement of a bead or bead portion, and slots perpendicular to the machine direction of the substrate are provided for heat sensor heads used for determining a length of a bead or bead portion. The slots forming sensor openings may be designed to be as small as possible, so that measurement tolerance is as small as possible.

In a further preferred embodiment the housing comprises a substantially flat lower portion which, when attached to said applicator head, is directed to said substrate, said lower portion comprises at least one recess, wherein said at least one heat sensor head is placed inside said recess for forming said mask. The opening of the recess preferably is formed as a slot which forms a sensor opening. Such recessed portions formed in a flat lower portion of the housing are a simple way to form a mask for masking the heat sensors to constrain a sensing area of the heat sensor head.

According to a further preferred embodiment the controller is connected to a control unit of said nozzle, for receiving a discharge signal of said nozzle for determining said desired adhesive pattern. The discharge signal of said nozzle is indicative for the desired adhesive pattern and therefore, the desired adhesive pattern can be determined based on the discharge signal of the nozzle. Knowing the distance between the heat sensor head and the nozzle, and the travelling speed of the substrate, the desired point of time when a specific heat sensor head should detect an adhesive bead or bead portion, is known. In case the specific heat sensor head detects the bead or bead portion earlier or later than the determined point of time, this is indicative for a faulty or poor adhesive pattern and the detected adhesive pattern is not within tolerances of the desired adhesive pattern and a pattern-fault signal may be output.

In a further preferred embodiment the inspection device comprises a speed detector for detecting a moving speed of the substrate, in particular the edge of the substrate. Such a speed detector preferably comprises an optical detector, such as a photo cell. The optical detector preferably is adapted to optically detect a speed of a substrate. Such an optical detector may comprise two optical sensors which are spaced in a travelling direction of the substrate by a known predetermined spacing. By means of such optical sensors, the speed of the substrate can easily be determined and the distance between edge and adhesive pattern can be calculated.

Preferably, the speed detector is mounted in close proximity to the sensor arrangement and/or the heat sensor head. Close proximity in this instance means that they are preferably mounted next to each other, preferably within a distance of 0.5 to 5.0 cm, in particular 2.5 cm. Preferably, the speed detector is arranged within the housing for housing the heat sensor head.

Furthermore it is preferred that the inspection device comprises a mounting bracket for attaching the housing in a defined relationship to the applicator head. The mounting bracket preferably is formed such that the housing has a defined relationship to the nozzle in the direction of substrate travel. Preferably the mounting bracket allows adjustment of the relation between the housing and the nozzle perpendicular to the direction of substrate travel.

Preferably, the mounting bracket comprises a first engagement section for engaging an applicator head and a second engagement section for engaging the housing. The mounting bracket has a known geometry and therefore it is possible to mount the housing, which houses at least said heat sensor head, in a known and predetermined relationship to the applicator head and/or to the nozzle while allowing for adjustment of the distance between sensor head and substrate. Preferably, the engagement section and/or the mounting bracket is formed of an insulating material, so that the housing, carried by the mounting bracket, is being insulated from the applicator.

In a preferred development, the first engagement section is adapted to be clamped about a nozzle body of the nozzle. For such an engagement, the engagement section may comprise first and second arms, which are provided with clamping means, such as a screw and nut, so that the mounting bracket may be clamped about a section of the nozzle body, preferably a substantially cylindrical section.

Alternatively, it is preferred that the first engagement section is adapted to be clamped about a portion of a basic body of the applicator head. It may also be adapted to be clamped about other predetermined and specific parts or sections of an applicator head, such as connectors, bars, mounting elements, insulating elements, such as covers, or the like. It is beneficial, when a specific predetermined portion of the applicator head is used to fix the mounting bracket, so that the housing is supported in a predetermined and defined relationship relative to the nozzle or the orifice of the nozzle.

In this instance it is furthermore preferred that the second engagement section of the mounting bracket comprises form fitting means for engaging the housing and the housing comprises respective form fitting means. Such form fitting means in particular may be dovetail-shaped projection and recesses or bow tie-shaped projection and recesses or other elements which act together in a form fitting manner.

Moreover, said controller preferably is adapted to analyze said detected adhesive pattern for a recurrent pattern and to set the recurrent pattern as the desired pattern. In a further embodiment, said detected adhesive pattern is compared to said pre-stored values of sensor levels to ensure it is within a plausible range prior to setting it as the desired pattern. When pre-stored values are available in a memory storage of the controller, also they are preferably used for determining whether the detected adhesive pattern is congruent with the desired pattern i.e. within defined tolerances of the desired pattern, which can be determined and/or calculated based on the pre-stored values.

In a third aspect of the invention, the above-mentioned object is achieved by an applicator head for dispensing hotmelt adhesive, comprising a basic body and a nozzle for discharging an adhesive, wherein the applicator head comprises an inspection device according to at least one of the above described preferred embodiments of an inspection device according to the second aspect of the invention, which is preferably attached to the applicator head, in particular the basic body, in close proximity to the nozzle. For the preferred embodiments of an applicator head according to the second aspect of the invention, reference is made to the preferred embodiments of the inspection device of the second aspect of the invention, since the applicator head comprises an inspection device according to the second aspect of the invention.

BRIEF DESCRIPTION OF THE DRAWINGS

The invention shall now be described in greater detail with reference to the preferred embodiments and to the attached figures, in which:

FIGS. 17a-17c show schematic views of three substrates with adhesive patterns.

DETAILED DESCRIPTION

Figure 1:
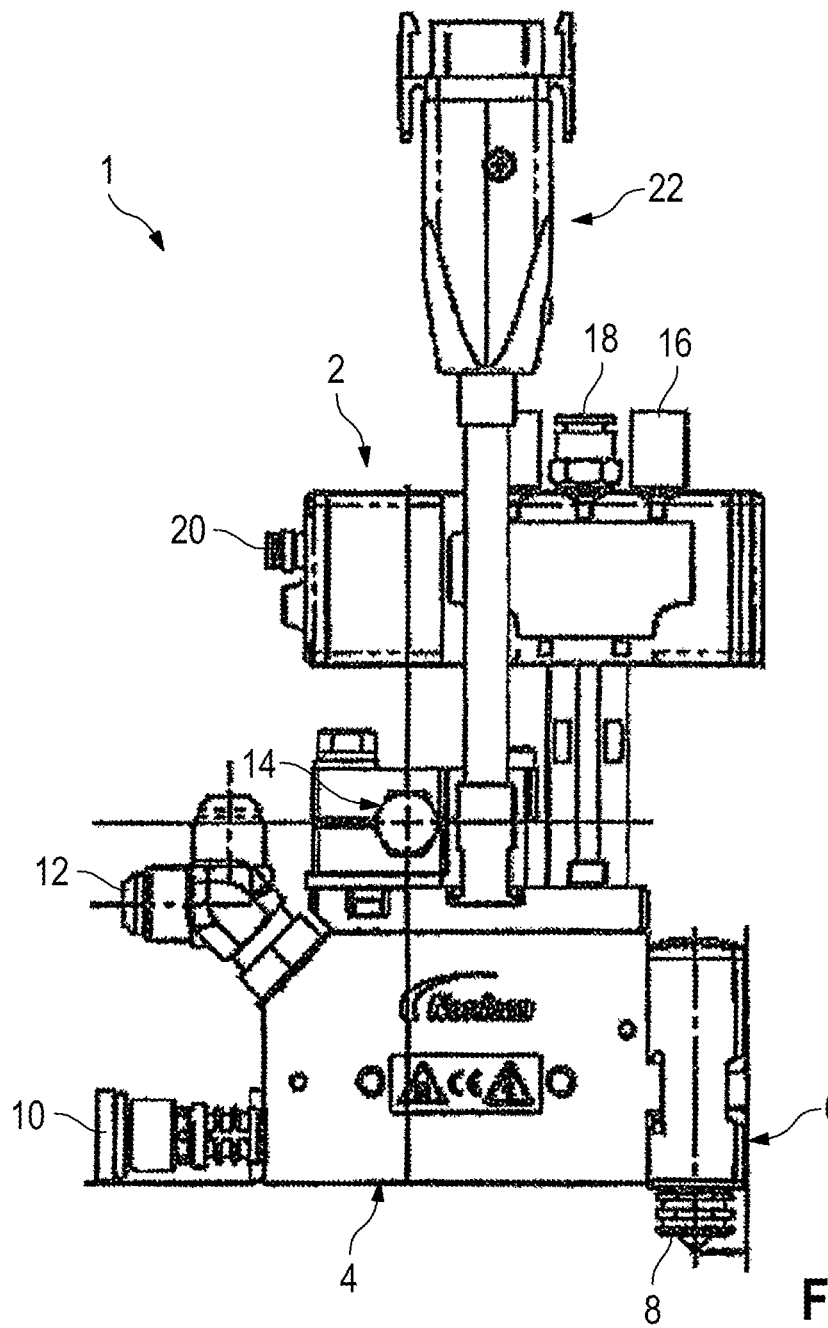
FIG. 1 shows a side elevation view of an applicator head adapted for use with the present invention.

FIG. 1 shows an applicator head 1 for dispensing a fluid, in particular liquid adhesive material, in particular hot-melt adhesive. Although hot-melt adhesive is preferred, other fluids such as glue, sealants, fat or similar can be used. The applicator head 1 includes a basic body 4 and a valve 2 preferably a solenoid valve 2 that is mounted on the basic body 4. Basic body 4 accommodates inter alia internal fluid channels for the fluid to be guided through the basic body and a heater for heating the fluid. Applicator head 1 is designed as a pneumatic applicator head having valve 2 which is operated by means of pressurized gas. Valve 2 is preferably a solenoid valve.

A module 6 provided with a nozzle 8 is attached to the basic body 4. A replaceable filter 10 is provided on an opposite side of basic body 4 from module 6. A tube connector 12 for supplying the fluid, in particular the hot-melt adhesive, is likewise disposed on the basic body 4. Tube connector 12 is therefore used as a fluid inlet connection and is connected in fluid communication to module 6 (in a manner not shown) via conduits inside the basic body 4.

A holding device 14 for securing the applicator head 1 to a mounting rod or to similar elements is also disposed on the basic body 4.

Solenoid valve 2 of applicator head 1 has one or more silencers 16, one of which is marked with a reference sign. Solenoid valve 2 is adapted to selectively release and close a pneumatic compressed air line in which compressed air is fed into applicator head 1 by means of a compressed air inlet 18. The valve 2 is actuated via a control signal which can be sent through port 20. Applicator head 1 also has an electrical connector 22 for coupling with a connection cable, which is used to supply electrical power to the heater located inside basic body 4.

According to this embodiment, it is proposed that a controller module is connected to the signal port 20 of the solenoid valve 2 of the applicator head 1. The controller module has a signal input port and a signal output port. For more details regarding this controller module, reference is made to the published patent application EP 2 638 978 A1 in the name of Nordson Corporation, Westlake, Ohio. It should be noted that even though it is preferred that the controller module is formed according to the published patent application EP 2 638 978 A1 it is not necessary. Other embodiments without a stitching-function are also preferred.

Figure 2:
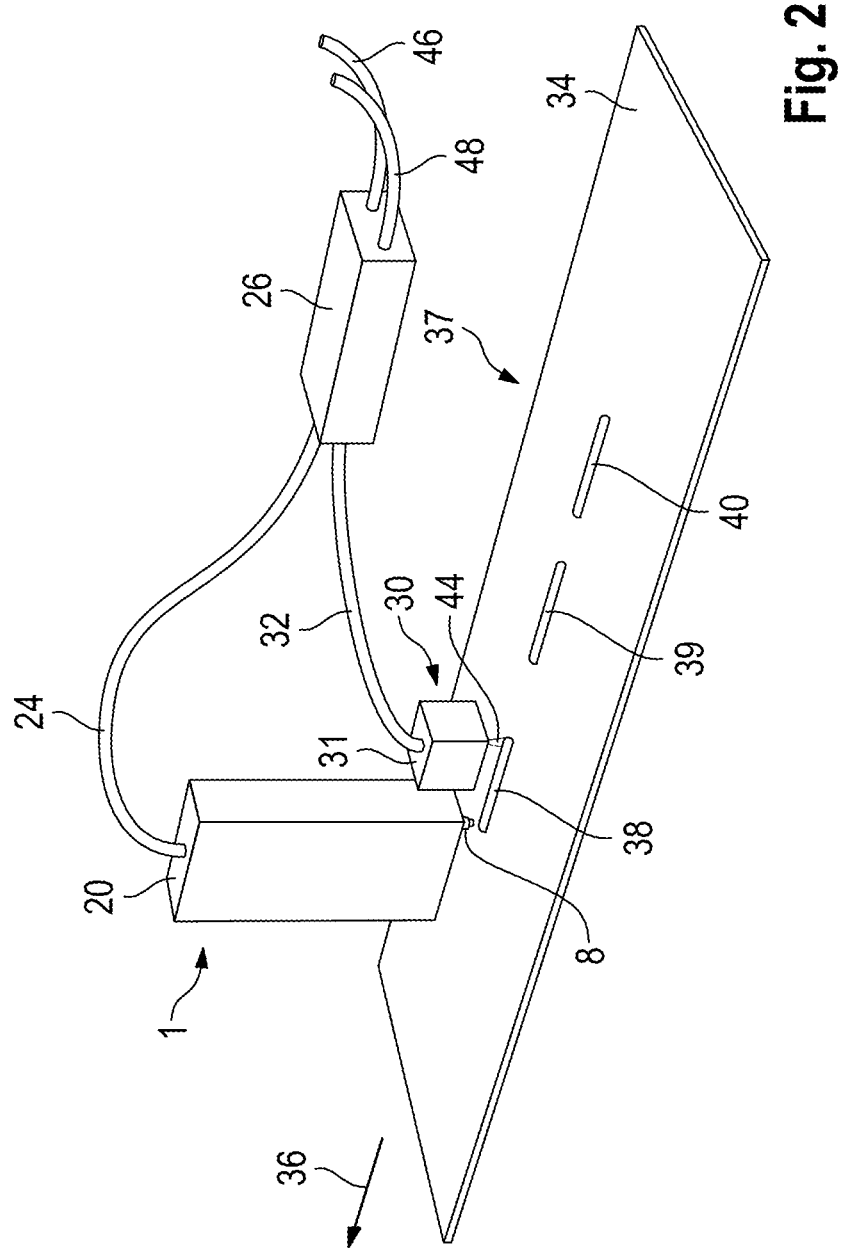
FIG. 2 shows an elevated view of the applicator head discharging fluid on a substrate together with an inspection device of the present invention.

FIG. 2 shows an applicator head 1, having a nozzle 8. Even though applicator head 1 according to FIG. 2 is only shown schematically, it should be understood that applicator head 1 comprises the essential features of applicator head 1 shown in FIG. 1. Applicator head 1 is connected via its signal port 20 to a signal line 24, connected to a control box 26. The control box comprises a control unit for the nozzle 8, which sends control signals to solenoid valve 2 for opening and closing valve 2 to control the fluid flow in said nozzle 8. The control unit, provided in control box 26, may also comprise means for transforming a primary discharge signal into a secondary ("stitching") discharge signal, as described in EP 2 638 978 A1.

According to FIG. 2, an inspection device 30 is provided in preferably close relation to the nozzle 8 of the module 6 of applicator head 1 or as a part of the applicator head 1. In this embodiment the inspection device 30 is attached to the basic body 4 of the applicator head 1. The inspection device 30 is connected via a signal line 32 to the control box 26. The control box 26 also comprises a controller for controlling the inspection device 30 (see also FIG. 11).

Both, the applicator head 1 and the inspection device 30 are shown relative to a substrate 34, in the illustrated exemplary embodiment above a substrate 34. The substrate 34 in this case is a continuous cardboard which is cut into pieces before or after application of adhesive. The substrate 34 moves into moving or machine direction 36 indicated by means of the arrow. When the substrate 34 moves relative to the applicator head 1, the nozzle 8 discharges adhesive and generates an adhesive pattern 37, consisting of beads 38, 39, 40 or other shapes (such as dots or films) of adhesive on the top surface of the substrate 34. The adhesive in this case is hot-melt adhesive radiating mainly infrared radiation.

The inspection device 30 according to this embodiment (cf. FIG. 2) comprises a housing 31 and a sensor arrangement 43 having a heat sensor head 42 (cf. FIG. 3) which detects the irradiated infrared radiation 44 of the adhesive bead 38. According to FIG. 2, both, the sensor arrangement 43 and heat sensor head 42 (not shown in FIG. 2) are housed in a housing 31 of the inspection device 30.

The controller, provided in the control box 26, receives the signals detected by the heat sensor head 42 via signal line 32 and compares the detected adhesive pattern with a desired adhesive pattern and outputs a pattern-fault signal when the detected adhesive pattern 37 is not congruent with the desired adhesive pattern. According to the embodiment shown in FIG. 2, the controller provided in the control box 26 receives information regarding the desired adhesive pattern from the control unit, provided in the control box 26 as well, which is the discharge signal pattern used for actuating the solenoid valve 2. Since the distance between heat sensor head 42 and nozzle 8 in the machine direction 36 is known, it is also known, when the heat sensor head 42 should detect or "see" the beads 38, 39, 40.

The control box 26 is further connected to an input signal line 46, which connects the control box 26 with a controlling device for the whole machine. Furthermore, the control box 26 is connected to a signal line 48 for a pattern-fault signal output by the controller, in case the detected adhesive pattern 37 is not congruent with the desired adhesive pattern. The signal line 48 may be connected to an alarm device, outputting an audio or a visual signal in case a pattern-fault signal is received (cf. FIG. 13).

Figure 3:
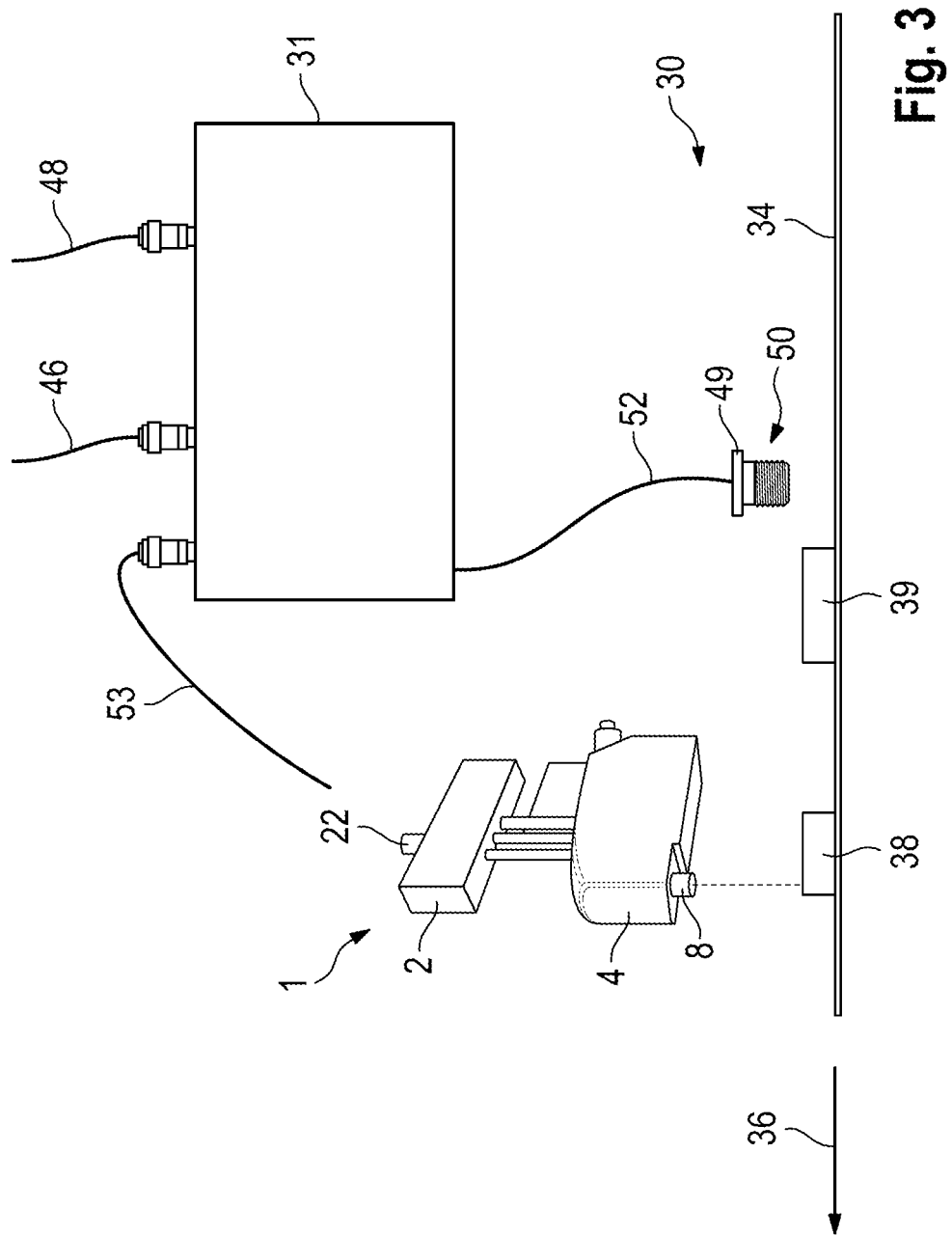
FIG. 3 shows an embodiment of an inspection device of the present invention.

While in the embodiment shown in FIG. 2, the sensor arrangement 43 and the heat sensor head 42 are integrated into the housing 31 of the inspection device 30, in the embodiment shown in FIG. 3, the heat sensor 43 is distally arranged from the heat sensor head 42. In FIG. 3, the housing 31 for housing the heat sensor head 42 also houses the sensor arrangement 43, which are not separately shown for simplifying the figure. Again an applicator head 1 comprises a solenoid valve 2, a basic body 4 and a nozzle 8. Adhesive beads 38, 39 are discharged on a substrate 34 by means of the nozzle 8. According to this embodiment, the sensor arrangement 43 comprises an infrared sensor. The heat sensor head is coupled to a fibre optic 52 comprised with a lens 50 for coupling infrared radiation into a fibre optic 52. The lens 50 is provided in a coupling means 49 haven a screw threaded portion such that the lens 50 can be attached to a support. The heat sensor head is arranged in the housing 31. Inside the housing 31 the sensor arrangement 43 is connected to the signal line 48 and the control line 46 for supplying the sensor arrangement 43 with electrical energy and control signals. Furthermore, the sensor arrangement 43 according to this embodiment is connected via a signal line 53 to the control unit (not shown) of the applicator head 1, for receiving control signals for the solenoid valve 2. As can easily be seen in FIG. 3, the sensor arrangement 43 is positioned with a distance to the lens 50, and thus may be arranged at a distance to the heated nozzle 8 and the hot-melt beads 38, 39, so that the sensor arrangement 43 does not receive excess heat.

Figure 4:
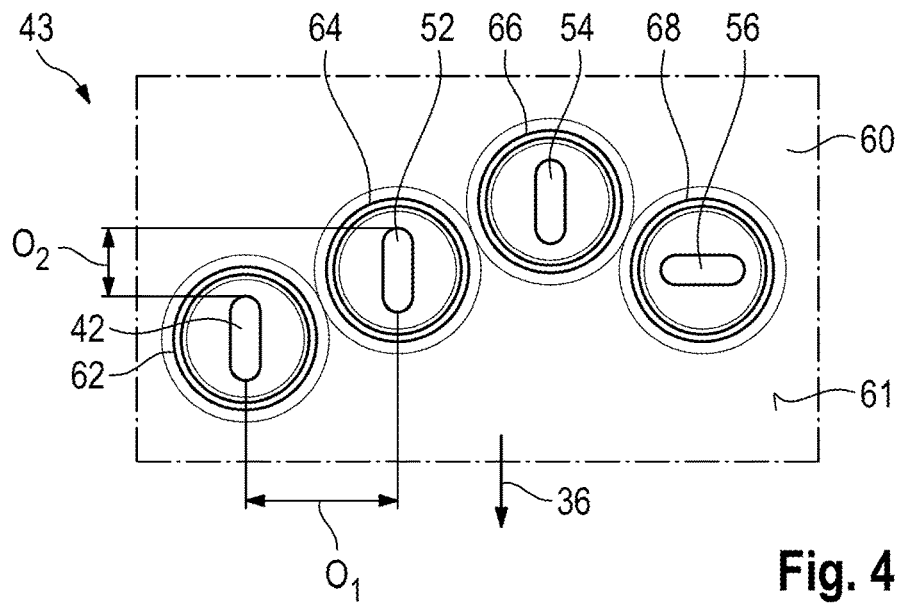
FIG. 4 shows a schematic view of four heat sensor heads together with a mask.

FIG. 4 shows a specific sensor arrangement 43 with four heat sensor heads 42, 52, 54, 56 which are comprised with a mask 60. The mask 60 in this embodiment is formed as a substantially flat housing portion of the housing 31 and comprises four recesses 62, 64, 66, 68 in which the respective heat sensor heads 42, 52, 54, 56 are arranged. Therefore, the heat sensor heads 42, 52, 54, 56 are recessed behind a surface 61 of the housing 31 in cylindrical recesses 62, 64, 66, 68 which in FIG. 4 extend into the plane of the figure. Openings of the recesses 62, 64, 66, 68 form sensor openings in this instance. Thus, the line of sight between the respective heat sensor heads 42, 52, 54, 56 and the adhesive beads 38, 39, 40 on the substrate 34 is restricted by means of the recesses 62, 64, 66, 68.

As can be seen from FIG. 4, heat sensor heads 42, 52 and 54 are arranged substantially parallel to the machine direction 36 of the substrate 34 and heat sensor head 56 is arranged perpendicular to the machine direction 36 of the substrate 34. Heat sensor head 56 is used for measuring the length of a bead 38, 39, 40 in the machine direction 36 and heat sensor heads 42, 52, 54, are used to detect a width of application of adhesive in the machine direction 36. The single heat sensor heads 42, 52, 54, 56 are offset to each other in the machine direction 36 and perpendicular to the machine direction. Exemplary for heat sensor heads 42 and 52 the offset O1, O2 is depicted in FIG. 4. When for example the corresponding heat sensor of heat sensor head 56 indicates that a bead is detected and outputs a signal, and also the corresponding heat sensor for heat sensor head 52 outputs a signal indicating that an adhesive bead is measured, however the heat sensor corresponding to heat sensor head 42 does not, it is known that the edge of the bead parallel to the machine direction 36 is between heat sensor heads 52 and 42, thus in the range of offset O1.

Offset O2, which is the offset in the machine direction 36, can be used to determine the travelling speed of the substrate 34. To this end, however, it is necessary that both, heat sensor heads 42 and 52, see the adhesive bead and the corresponding heat sensors for the heat sensor heads 42 and 52 output a signal indicating that a bead is detected. When e.g. the heat sensor corresponding to heat sensor head 52 first indicates a signal and afterwards the heat sensor corresponding to heat sensor head 42 indicates a signal, the time gap between these two signals can be measured and compared with the spacing between the two heat sensor heads, thus the offset O2, and subsequently the travelling speed can be measured.

However, even though the heat sensors can be used to determine a travelling speed, it is even more preferred that the inspection device 30 comprises a separate speed detector. In this embodiment, an optical speed detector, such as two photocells (cf. FIG. 11), which are offset by O2, can be used.

Figure 5:
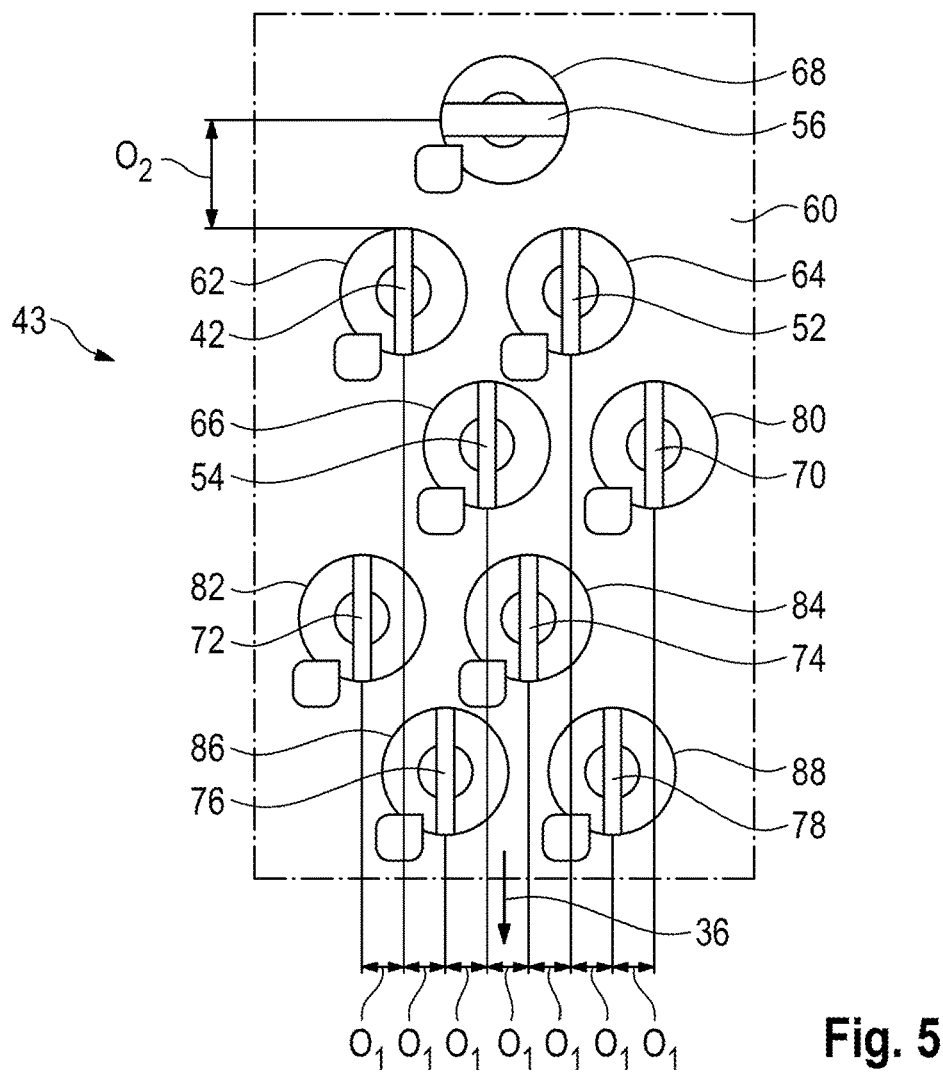
FIG. 5 shows a second embodiment of nine heat sensor heads with a mask.

FIG. 5 shows another alternative of a mask 60 which can be provided for the inspection device 30, described above. In FIG. 5, similar and identical parts, already described with respect to FIG. 4, are depicted with identical reference signs and in so far reference is made to the above description of FIG. 4. According to FIG. 5, in total nine heat sensor heads 42, 52, 54, 56, 70, 72, 74, 76, 78 are provided and each connected with a corresponding heat sensor. Each heat sensor head 42, 52, 54, 56, 70, 72, 74, 76, 78 is provided in a respective recess 62, 64, 66, 68, 80, 82, 84, 86, 88, so that the line of sight between the respective heat sensor head 42, 52, 54, 56, 70, 72, 74, 76, 78 and the substrate 34 is restricted to focus the heat sensor head 42, 52, 54, 56, 70, 72, 74, 76, 78 on a specific area of the substrate 34.

Again, in accordance with the embodiment of the mask 60 shown in FIG. 4, the mask 60 of FIG. 5 is formed in such a way that one heat sensor head 56 is arranged substantially perpendicular to the machine direction 36 of the substrate 34, and the further eight heat sensor heads 42, 52, 54, 70, 72, 74, 76, 78 are arranged substantially parallel to the machine direction 36 of the substrate 34. Due to this arrangement, the dimension of the heat sensor head 56 perpendicular to the direction 36 is much more extensive than the dimension of the heat sensor head 56 in the direction 36. Due to this arrangement, heat sensor head 56 is relatively tolerant regarding the width of an adhesive bead and also the lateral placement of the bead regarding the substrate 34, however using heat sensor head 56, the length of the bead can be detected within relatively small tolerances.

The further eight heat sensor heads 42, 52, 54, 70, 72, 74, 76, 78 are arranged offset to each other perpendicular to the machine direction 36. All these heat sensor heads are arranged with an offset O1 to each other, and thus are evenly distributed over the width of the mask 60. Due to this arrangement, a detailed detection of adhesive bead width and presence in the width direction of the substrate is possible. Additionally, the heat sensor heads are arranged offset to each other in the direction 36, which is exemplarily shown with respect to heat sensor heads 56 and 42. Due to this offset O2, the travelling speed of the substrate can be detected.

Reference is now made to FIGS. 6 to 9 which each show an applicator head 1 which substantially corresponds to the applicator head 1 shown in FIG. 1. In so far, reference is made to the above description. Similar elements in FIGS. 6 to 9 are indicated with identical reference signs. In contrast to the embodiment shown in FIG. 1, the applicator head of FIGS. 6 to 9 comprises a shell 100 enclosing the basic body 4 and the module 6 (in FIGS. 6 to 9 now shown).

The applicator heads 1 of FIGS. 6 to 9 are provided with an inspection device 30 according to the present invention. The inspection device 30 comprises a housing 31 which houses both, the heat sensor heads and the heat sensor (in FIGS. 6 to 9 not shown in detail). Furthermore, a controller 102 is provided which is connected via a signal line 104 to the heat sensors, which are provided in the housing 31. According to this embodiment, the controller 102 is provided as a separate unit, while in the embodiment shown in FIG. 2 and described above the controller is provided within control box 26, which is connected to both, the housing 31 and the applicator head 1. In the embodiment of FIGS. 6 to 9, the control box of the applicator head 1 is not shown but would be connected to the connector 22. Furthermore, one of the signal lines 105, 106 is connected to the control box 26 (not shown in FIGS. 6 to 9).

Figure 7:
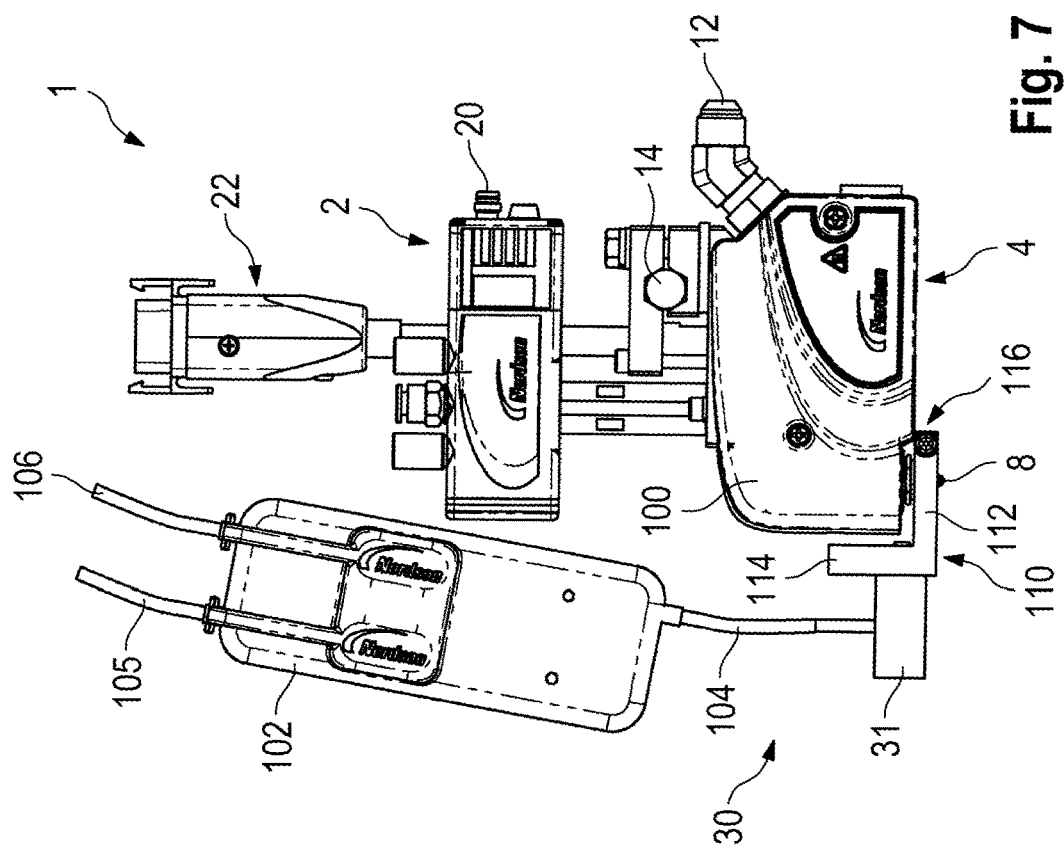
FIG. 7 shows the inspection device attached to the applicator head by means of the mounting bracket of FIG. 6 in a side view.
Figure 6:
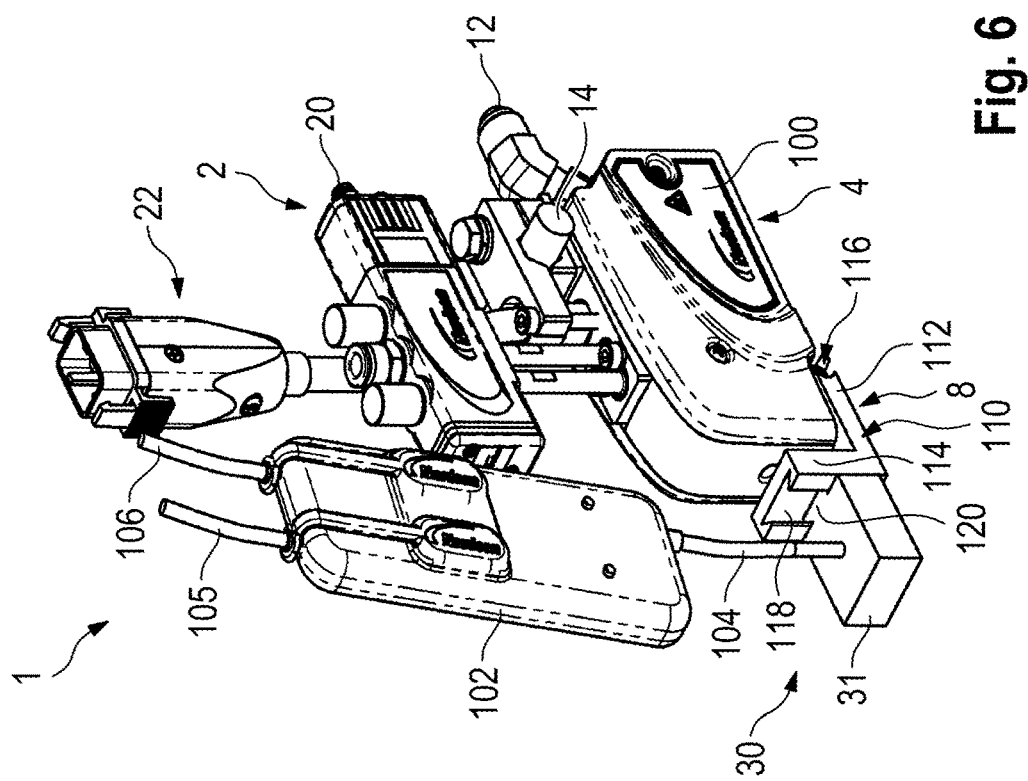
FIG. 6 shows an inspection device attached to an applicator head by means of a mounting bracket according to a first embodiment in an elevated view.

According to the embodiment shown in FIGS. 6 to 9, the housing 31 is attached to the applicator head by means of a mounting bracket 110. The mounting bracket 110 comprises a first engagement section 112 for engaging the applicator head 1 and a second engagement section 114 for engaging the housing 31. Both sections are substantially formed as arms which are provided rectangular to each other. The mounting bracket 110 is formed out of a thermoinsulating material, such as plastics, so that the housing 31 is insulated against the nozzle 8. The first engagement section 112 according to the embodiment shown in FIGS. 6 and 7 is formed to engage a portion of the nozzle, in particular a circumferential outer surface of the nozzle 8. Therefore, the first engagement section 112 comprises a clamping means 116 for clamping the mounting bracket 110 against the nozzle 8. The second engagement section 114 comprises a dovetail-shaped recess 118 and the housing 31 comprises a correspondingly dovetail-shaped protrusion 120. Due to these matching forms, the housing 31 can be fixed against the mounting brackets 110 easily and without additional tools. When engaged, the geometric properties between housing 31 and nozzle 8 are known in a predetermined range.

Figure 9:
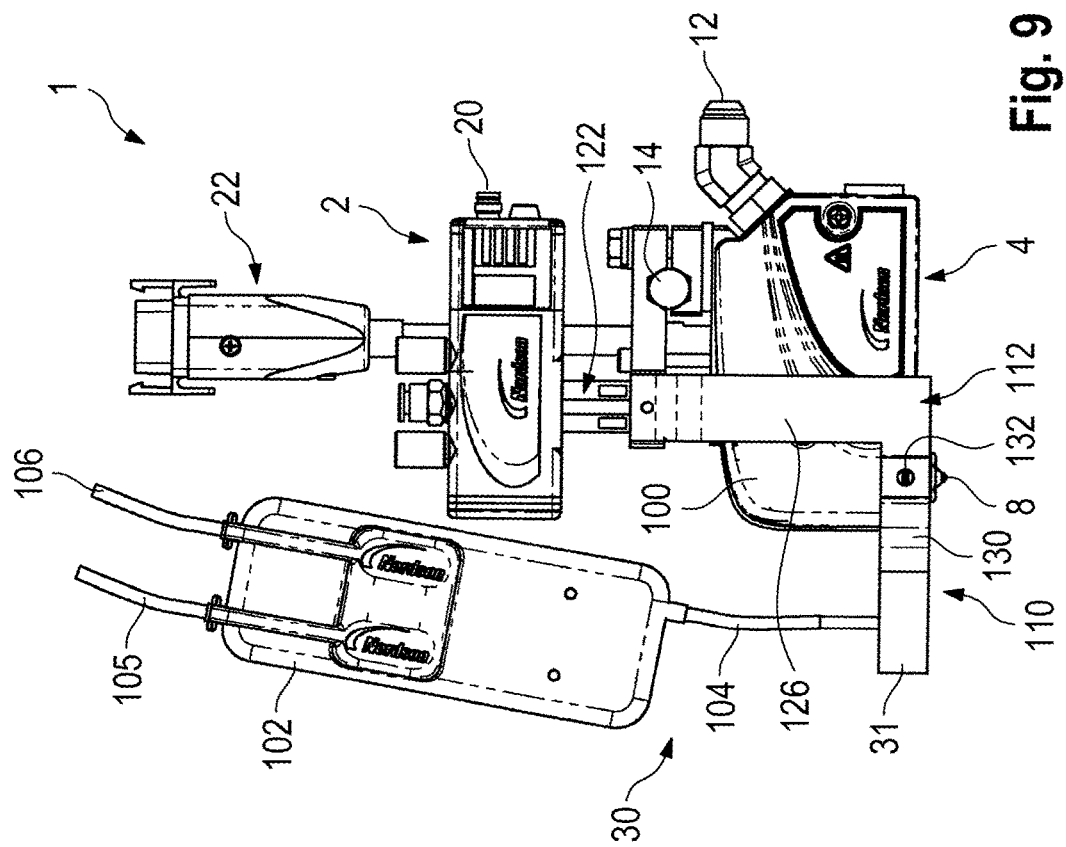
FIG. 9 shows the inspection device attached to the applicator head by means of the mounting bracket of FIG. 8 in a side view.
Figure 8:
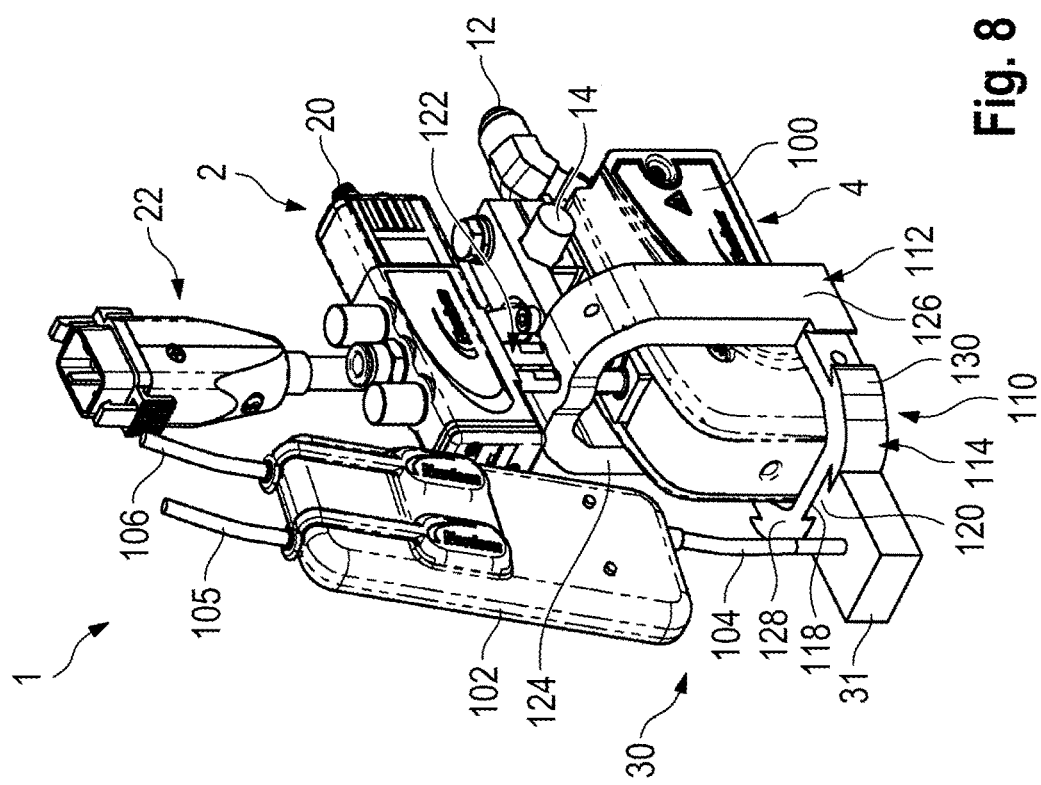
FIG. 8 shows an inspection device attached to an applicator head by means of a mounting bracket according to a second embodiment in an elevated view.

FIGS. 8 and 9 illustrate an alternative embodiment of the mounting bracket 110. The elements of the applicator head 1 and the inspection device 30 are substantially identical to those shown in FIGS. 6 and 7 and in so far reference is made to the above description and in the following in particular the difference between the two mounting brackets 110 of FIGS. 6, 7, 8 and 9 is described.

The mounting bracket 110 again comprises a first engagement section 112 and a second engagement section 114. The first engagement section 112 engages the applicator head 1 and the second engagement section 114 engages the housing 31 of the inspection device 30. In contrast to the above embodiment shown in FIGS. 6 and 7, the first engagement section 112 is mounted against a portion 122 of the pneumatic solenoid valve 2, in particular two pipes connecting the basic body 4 with the valve 2. Fixing the first engagement section 112 against such a portion 122 can be beneficial in application of hotmelt adhesive, since there is no direct heat bridge from the nozzle 8 to the housing 31. Furthermore, it may be beneficial when for example the nozzle module 6 (see FIG. 1) needs to be changed, the mounting bracket 110 still can be maintained in place.

The first engagement section 112 is substantially U-shaped having two legs 124, 126 running downwards from the portion 122 at two opposing sides of the basic body 4. At the lowermost portions, the legs 124, 126 are connected with the second engagement section 114. Also the second engagement section 114 is substantially U-shaped having two legs 128, 130. The legs 128, 130 are connected to the legs 124, 126 by means of a screw connection 132.

Again, as also shown in FIGS. 6 and 7, the second engagement section 114 comprises a dovetail-shaped recess 118 and the housing 31 comprises a correspondingly dovetail-shaped projection 120. By means of the recess 118 and the projection 120, the housing 31 can be form fittingly connected to the second engagement section 114. Due to the mounting brackets 110 shown in FIGS. 8 and 9, the housing 31 is in a known and predetermined relationship to the nozzle 8, when engaged.

Figure 10:
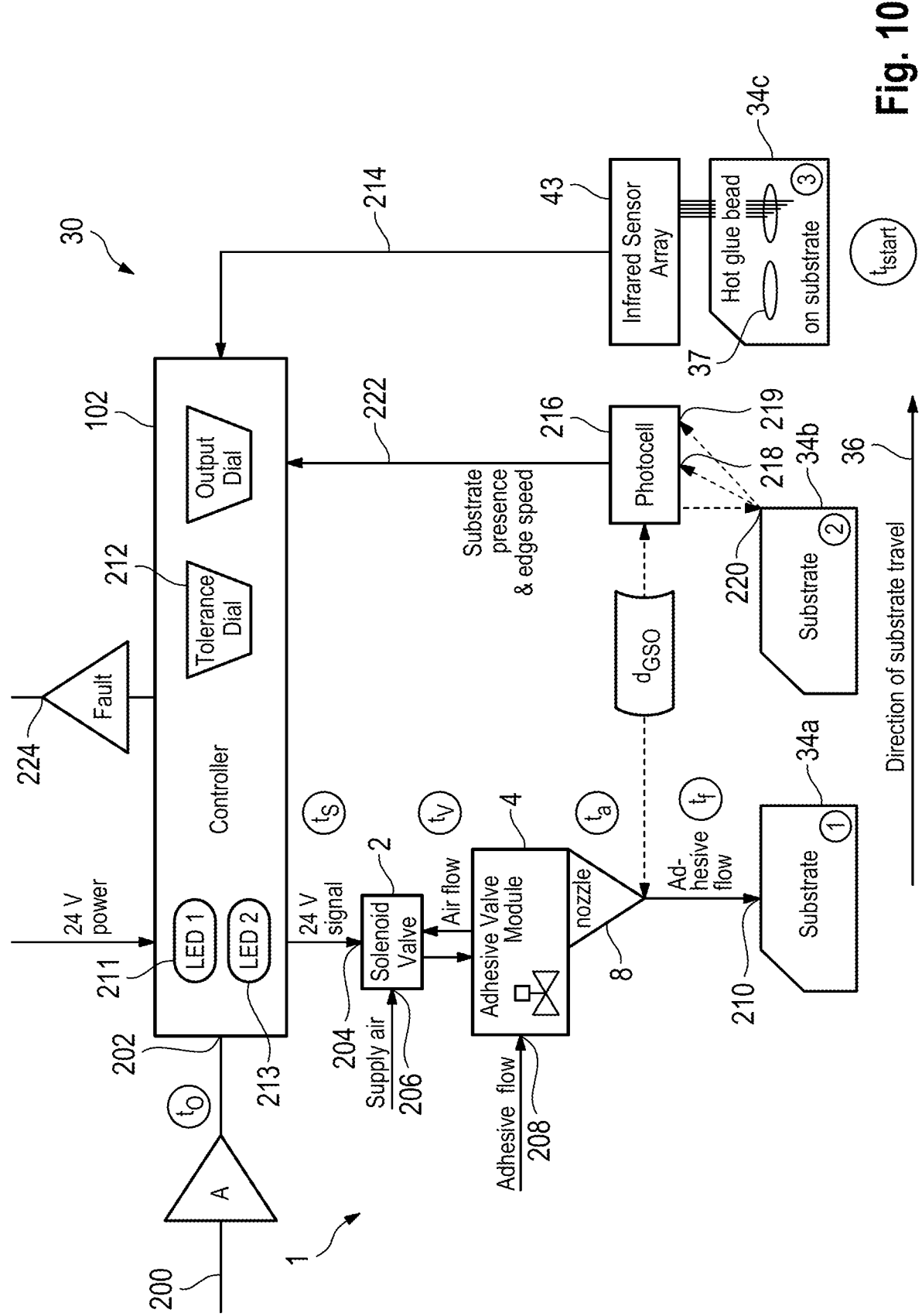
FIG. 10 shows a block diagram illustrating an applicator head with an inspection device.

FIG. 10 shows in a block diagram the principle arrangement of an inspection device according to the invention. Again, for identical parts identical reference signs are used and in so far reference is made to the above description.

On the left hand side of FIG. 10, the applicator head 1 is shown having the valve 2, the basic body 4 and the nozzle 8. A discharge signal 200 is intercepted at 202 by the controller 102, before running at 204 to the solenoid valve 2. The solenoid valve 2 receives a supply of air 206 and provides air flow to the adhesive valve module 4. The adhesive valve module 4 receives an adhesive flow 208. The nozzle 8 discharges adhesive 210 on a substrate 34a, which travels in the machine direction 36. In FIG. 10 two more substrates 34b, 34c are shown, onto which an adhesive pattern 37 has already been discharged.

The controller 102 intercepts the discharge signal 200 and determines based on the discharge signal 200 the desired adhesive pattern, using predetermined tolerances set by means of the tolerance dial 212. The tolerance dial allows an operator to set a desired tolerance within which the discharged adhesive pattern should be. The controller 102 is connected to a sensor arrangement 43, in this embodiment preferably formed as a heat sensor array as shown in FIG. 5. The sensor arrangement 43 provides a heat intensity data array signal 214 to the controller 102. The inspection device 30 furthermore comprises a speed detector 216 in this embodiment formed as two photo cells 218, 219, which detect a leading edge 220 of the substrate 34. The speed detector 216 provides a substrate presence and edge speed signal to the controller 102. The speed detector 216 and the sensor arrangement 43 are arranged in close proximity next to each other within the same housing (not shown in FIG. 10).

The distance dGSO between nozzle 8 and sensor unit, comprising the speed detector 216 and the sensor arrangement 43, is known. Furthermore, process parameters, in particular delay times, are known. When the discharge signal 200 is generated at t0, it is provided to the solenoid valve 2. Until the solenoid of the solenoid valve 2 is energized, it takes a time ts. For the valve to react there is additional time tv, the actual delay for air flow into adhesive valve module. Dependent on the type of adhesive used, there is an additional delay time ta, for the adhesive to flow out of the nozzle tip. This delay is dependent on the type of valve, the adhesive pressure and viscosity, and wear in the valve over its lifetime. A high viscosity, low pressure and small nozzle orifice in general lead to a higher ta value. After the adhesive has been discharged, it flies through the air until it contacts the substrate 34. The time tf is the actual delay for adhesive flight from nozzle tip to substrate. The parameters ts, tv, ta, and tf may be determined experimentally. From the parameters t0, ts, tv, ta, tf, dGSO and the detected speed vs of the substrate, it is known when the respective heat sensor head should "see" the pattern 37, when the discharged pattern 37 is congruent to the desired pattern. If the detected pattern 37 is within the set tolerance, the adhesive pattern 37 is deemed to be congruent. Otherwise, it is detected as a faulty pattern and a pattern-fault signal 224 is outputted by the controller 102.

Figure 11:
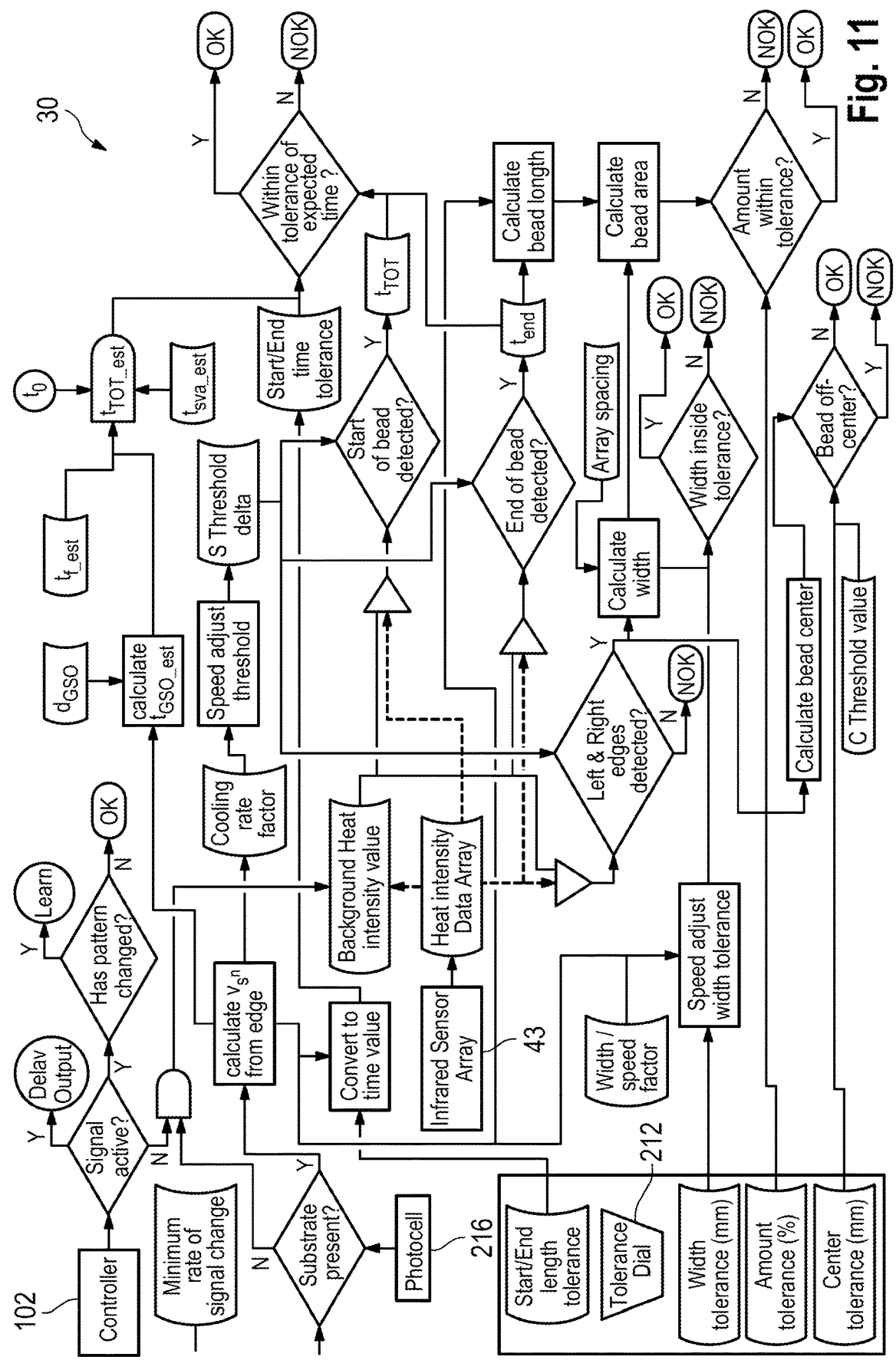
FIG. 11 shows a signal logic diagram illustrating a method for inspecting an adhesive pattern on a substrate.

FIG. 11 illustrates the signal logic of the inspection device 30. The controller 102 intercepts the discharge signal, as described above.

When the controller determines in the step "Signal Active?" that no discharge signal is received and at the same time the speed detector 216 determines that no substrate is present, it is known that there is no substrate in the sensing field of the sensor arrangement 43. The detected heat intensity data array to this point of time is thus a "Background Heat Intensity Value" which is stored and used later on when determining the presence of a pattern. When the controller 102 determines that a discharge signal is present, it furthermore checks whether the pattern has changed in step "Has Pattern Changed?". When the pattern has not changed, the normal running mode is operated. Otherwise, when the pattern has changed, the controller 102 switches into a learning mode (which will be described below with reference to FIG. 12). It should be noted that the learning mode is not entered due to an operator pressing a teach button, but based on the change in the pattern itself.

By means of the tolerance dial 212, four different tolerance values can be set and/or adjusted. First of all a "start/end length tolerance" value is set, then a "width tolerance", an "amount tolerance", and a "center tolerance" value. The "start/end length tolerance" is used together with the determined speed, which has been determined in step "Calculate vs From Edge" and converted into a time value.

For detecting the adhesive pattern 37, according to this embodiment (FIG. 11), a threshold value is used. Staring from the determined background heat intensity value, when a heat above a predetermined threshold value is reached at step "Start of Bead Detected?", which is determined based on the background heat intensity value, it is deemed that a start of a bead is detected until the value sinks again below the threshold. The threshold value can be determined experimentally. From the detected substrate velocity, the threshold can be speed-adjusted using a known cooling rate factor which is dependent on the environmental temperature, the substrate speed, the type of adhesive, and potential other parameters. Furthermore it is determined whether the time of the start point is within the total estimated time and within the tolerance of the expected time at the step "Within Tolerance of Expected Time?", and when it is not within this tolerance, a pattern-fault signal is outputted.

When detecting a start of the bead at "Start of Bead Detected?" based on the heat intensity data array detected by the heat sensor 43, the "start/end length tolerance" is used to check whether the start time of a bead is within expected tolerance time. This is determined in the step "Within Tolerance of Expected Time?". If not o.k., a pattern-fault signal is outputted.

The width tolerance value may be used together with a "Width Speed Factor" to determine a speed adjust width tolerance. If the user selects a width tolerance with speed dependence, which would normally be used when the adhesive pressure is not adjusted depending on the machine speed and thus wider bead is expected at slower speeds, the width tolerance is scaled by the velocity and stored as a "Width/Speed Factor", which is determined experimentally. Therefore, when the speed of the substrate is known it is possible to adjust the width tolerance based on the detected speed. Using the heat intensity data array, left and right edges of the pattern can be detected. From these the width of the pattern can be calculated and it can be checked whether this is within set tolerances. The last step is carried out at "Width Inside Tolerance?". If these are not o.k., a pattern-fault signal is outputted.

From the calculated width, the bead length and also a known array spacing of the heat sensor array, a bead area can be calculated. When calculating the bead area it can be determined whether the adhesive amount is within the set tolerance. This is checked at the step "Amount Within Tolerance?". If the determined adhesive amount on the substrate is not within the set amount tolerance, a pattern-fault signal is outputted.

Furthermore, the center of the pattern is determined. Therefore, the "Center Tolerance" value is used. When the left and right edges of the pattern are determined, the bead center can be calculated. Using the center tolerance value, it is determined whether the bead is within this tolerance. This is checked at step "bead of center?". If the bead center is not within the predetermined tolerance, a pattern-fault signal is outputted.

Figure 12:
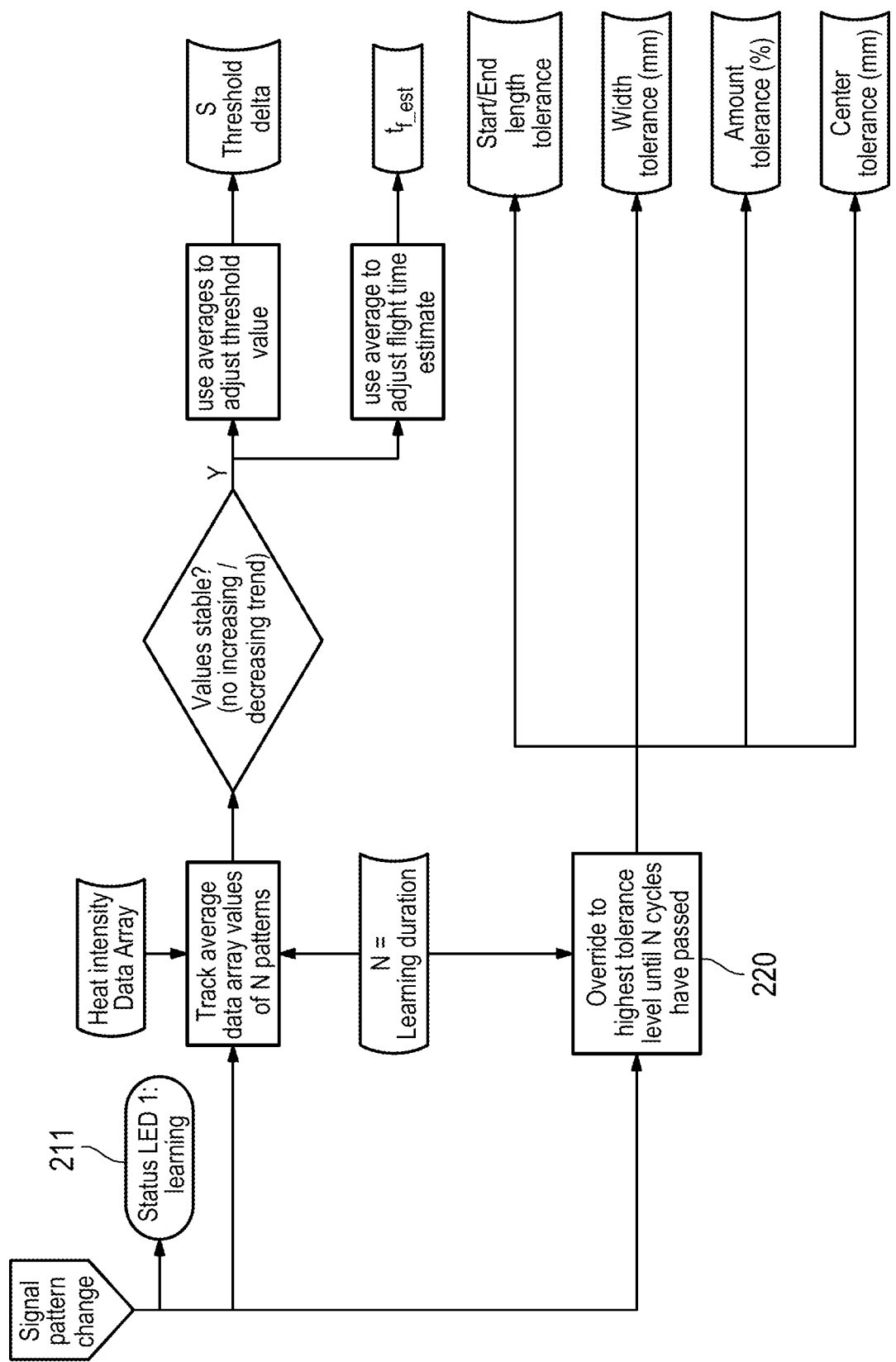
FIG. 12 shows a signal logic diagram of a learning mode of the method for inspecting an adhesive pattern on a substrate.

With reference to FIG. 12, the learning mode is now explained. When the controller 102 detects that a discharge signal has changed (see FIG. 11), or that a discharge signal has been detected for the first time, e.g. after starting the inspection device, the learning mode is entered. In the learning mode the status LED 211 is switched yellow, indicating that the controller 102 is in the learning mode. When the learning mode is entered, the set tolerance values are overwritten to the highest tolerance level 220 until N cycles have passed. The value N stands for the learning duration, that is the number of substrates which are used in the learning mode. For example, ten substrates are used for the learning mode. Dependent on the time of application also a smaller or higher number can be used. When in the learning mode, the controller tracks the average data array values of each of the N patterns. When it is determined that these values are stable, i.e. when the absolute change and the change rate between the detected patterns is within predefined tolerances, indicating there is no increasing/decreasing trend, the average of all or of a subgroup of the N detected patterns or of a following group of N+x patterns is used to adjust the threshold value and thus to determine a new adjusted desired pattern. After the new desired pattern has been set, the learning mode is ended and the controller returns to normal operation mode as shown in FIG. 11.

As stated above, when in the learning mode, the tolerances (position, width, amount, center) set by the tolerance dial 212 are overridden to a stored highest tolerance level 220, preferably determined by experiments to cover a range such that the vast majority of plausible sensor values are included, both in terms of timing (position) and intensity of heat/infrared radiation (amount). In terms of timing, in one extreme, an application with an adhesive with a low viscosity applied at a high pressure through a small nozzle onto a close substrate, which will have fast valve actuation, fast flow through the valve and nozzle and a short time of flight to the substrate over the short distance, will have a short total delay. In the other extreme, a highly viscous adhesive at low pressure through a large nozzle to a substrate that is far away will have a long total delay. In terms of heat/infrared intensity, in one extreme, a high-temperature adhesive applied in large amounts onto a fast moving substrate will quickly reach the sensor with little cooling and will give a high and wide reading from the heat sensor array. In the other extreme, a low temperature adhesive applied in small amounts at slow speeds will give a narrow and low reading from the array. The verification nevertheless remains active during learning with these extended tolerances 220 in order to give a fault output if no or very atypical heat intensity data is received.

Figure 13:
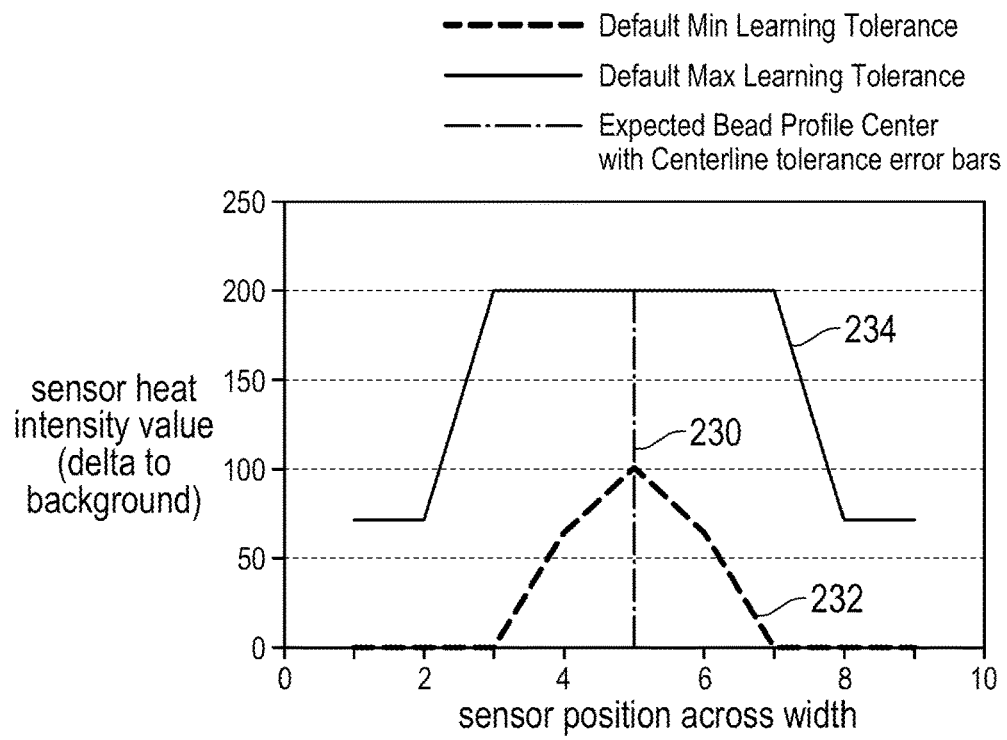
FIG. 13 shows a first diagram showing maximum tolerance curves for the learning mode.

An example of what the threshold intensity level could look like when in learning mode is shown in FIG. 13. To be recognized as present, the center of the bead preferably gives a reading of at least 100 (cf. FIG. 13, "sensor heat intensity value" on ordinate), and neighboring sensors in the array preferably give a reading of at least 65. This would correspond to a typical narrow, cool bead. The center of the bead (found by looking for the peak in the curve of array values) can also range almost the entire width of the sensor. Upper values could also exist particularly for the outer sensing elements to ensure the sensor is still seeing both edges of the bead.

In FIG. 13, the abscissa indicates the sensor position across the width of the substrate. The ordinate indicates the sensor intensity normalized with an index value. The dashed vertical line 230 indicates an expected centerline of a pattern and/or a bead. This may be set by an operator or determined based on pre-stored values. The lower curve 232 shows a lower limit of the tolerance range and the upper curve 234 indicates the upper limit of the tolerance range. Every measured curve within the area defined between curves 232 and 234 would be within the tolerance in the learning mode.

Figure 14:
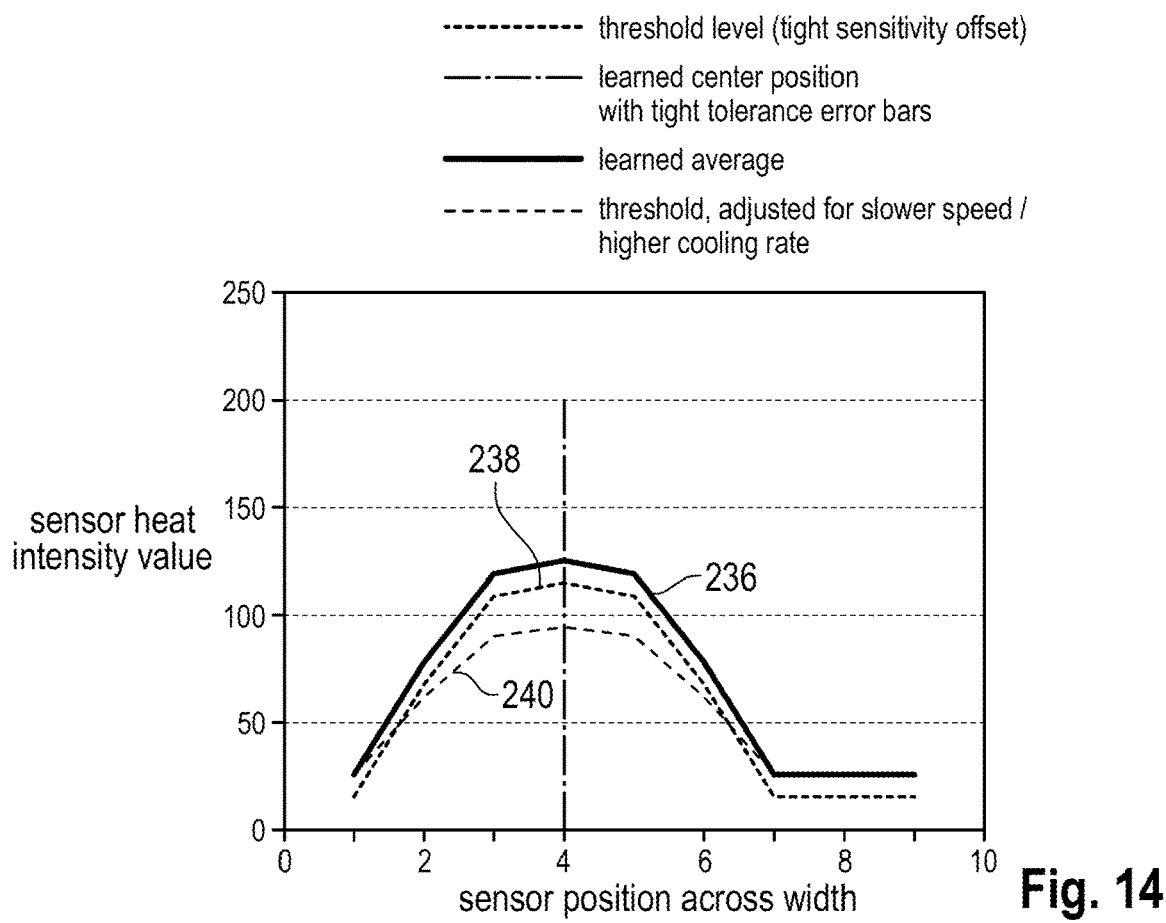
FIG. 14 shows a second diagram showing a learned tolerance curve.

When the controller turns in the normal operation mode as shown in FIG. 11, the tolerance is set back to the normal mode. This is illustrated in FIG. 14. Again the ordinate indicates the sensor intensity normalized with an index value and the abscissa indicates the sensor position across the width of the substrate, as it was in FIG. 13. In this diagram the learned curve 236 of the desired adhesive pattern is shown. Two threshold curves are drawn, a first threshold level 238 for a tight sensitivity offset and a second, lower one 240 which is adjusted and adapted for slower speeds of the substrate and/or higher cooling rates, so that sensor heat intensity value is lower.

Figure 15:
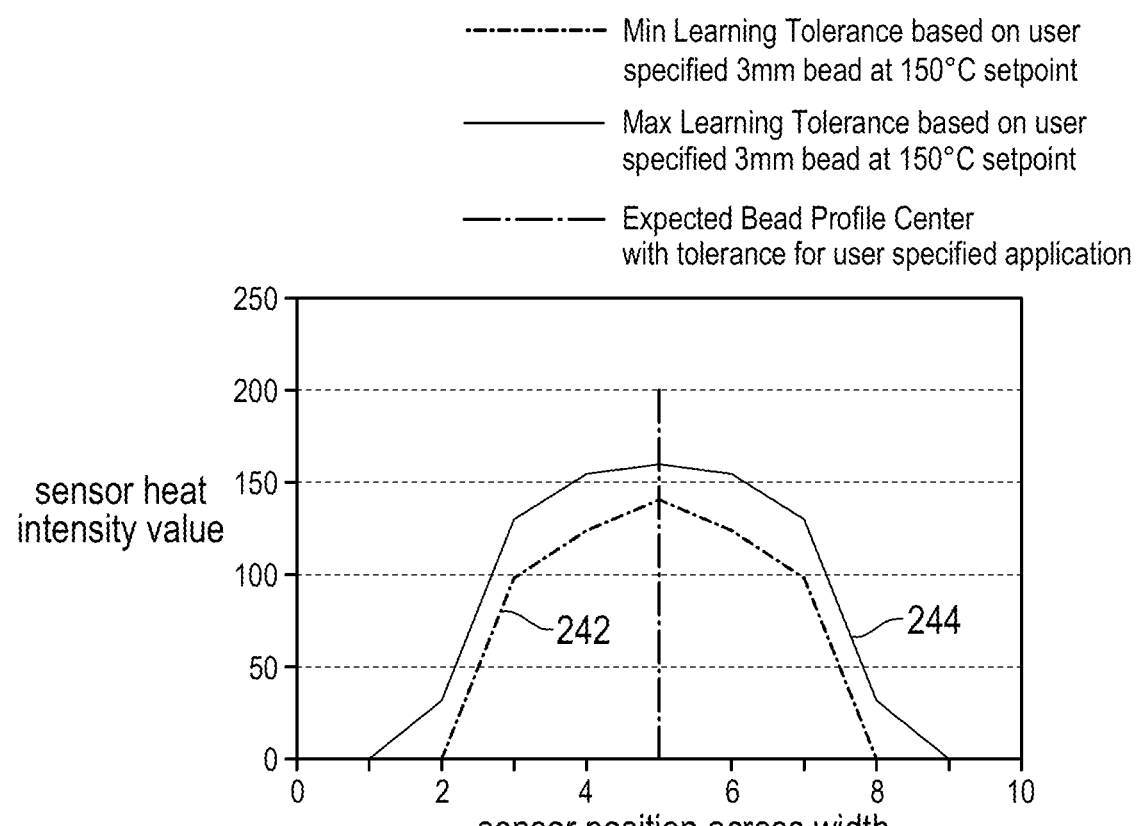
FIG. 15 shows a third diagram indicating a set narrow tolerance.

To facilitate more accurate verification during the learning phase, a custom programming interface could be used to allow the user to enter their application data (bead width, set-point temperature), which would result in the use of stored data from experiments that matches (or is interpolated to best match) the user conditions to be used to define a narrower learning range for the threshold. This is indicated in FIG. 15, which shows a lower curve 242 indicating a lower limit of the set tolerance range, and an upper curve 244 illustrating an upper limit of the tolerance range. Every detected pattern whose curve would fit in between those curves 242 and 244 would be considered congruent with the desired adhesive pattern.

Figure 16:
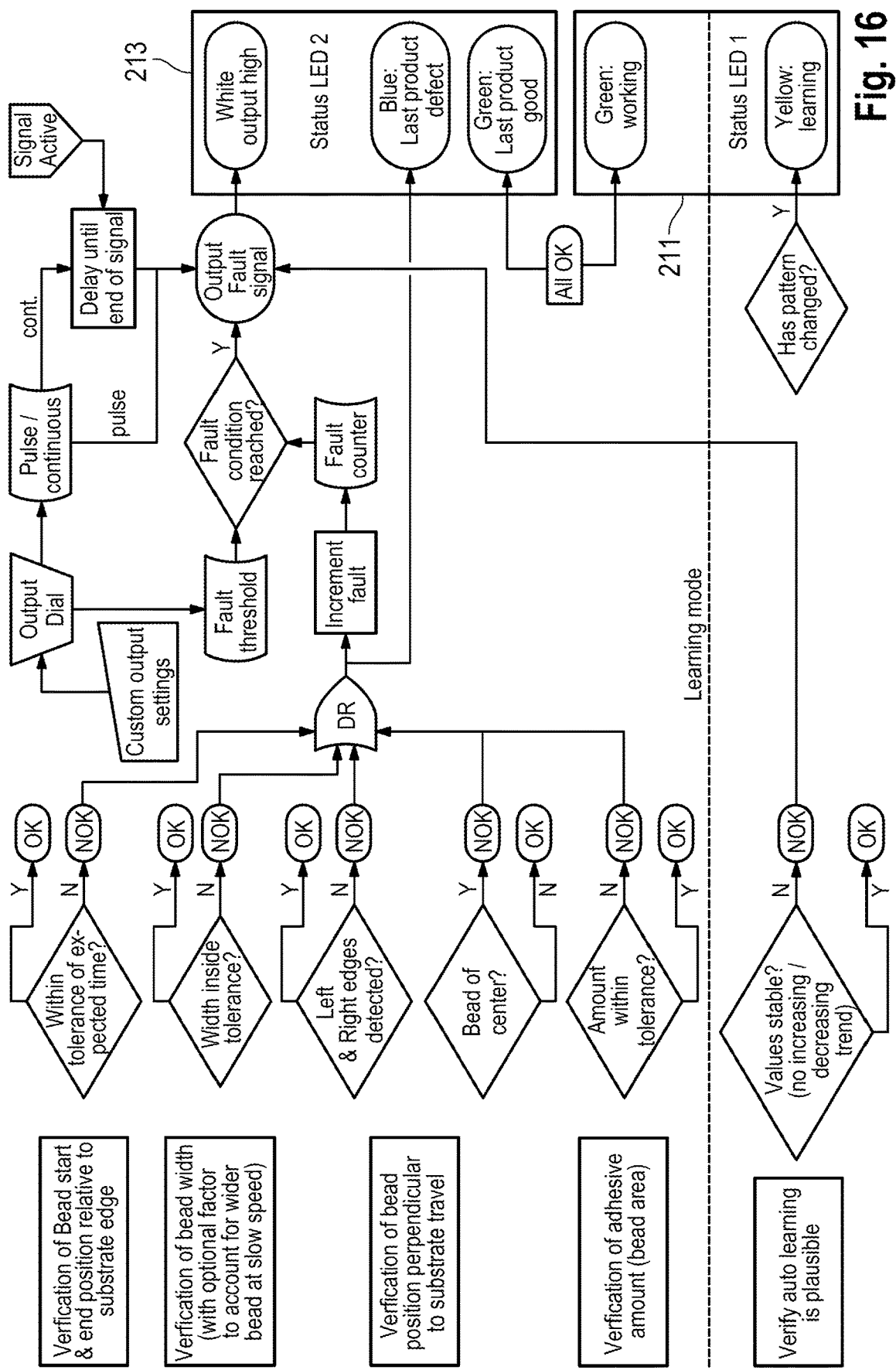
FIG. 16 illustrated a signal output of the device according to the method for inspecting an adhesive pattern on a substrate.

FIG. 16 illustrates an output logic of the controller 102. As shown in FIG. 10, the controller comprises two status LEDs, 211, 213. The status LED 211 according to this embodiment can switch between green and yellow and the status LED 213 can switch between white, blue and green. While status LED 211 is used to indicate whether the controller 102 is in learning mode (yellow) or in working mode (green), status LED 213 is used to indicate whether the last product is defect or not. As described above with reference to FIG. 11, it is checked whether the detected bead is within length tolerance, width tolerance, amount tolerance and center tolerance. Therefore, verification of a bead start/end position relative to substrate edge, verification of bead width, verification of bead position perpendicular to substrate travel, and verification of adhesive amount (bead area) are carried out. If any of these tolerances is not met, a fault counter is incremented. At the same time, the status LED 213 is switched to blue. Otherwise, when all tolerances are met, status LED 213 is maintained green. At the same time it may be provided that status LED 213 also flashes white, when a poor pattern is detected. Alternatively, at the end of the pattern cycle, status LED 213 may be switched white with a high voltage signal, in case the number in fault counter has reached a predetermined threshold.

FIGS. 17a to 17c show different examples of adhesive patterns 37a, 37b, 37c. First reference is made to FIG. 17a. In FIG. 17a a row of three substrates 34a, 34b, 34c are shown, wherein the machine direction is to the left with respect to FIG. 6a. On substrate 34a an adhesive pattern 37a is discharged including an adhesive bead 38a and an adhesive bead 39a. Between these two beads 38a, 39a a gap 90 is provided. On the next substrate 34b again an adhesive bead 38b and an adhesive bead 39b is discharged. Between the two beads 39a and 38b, a gap 91 is provided. A gap 92 is provided between adhesive beads 38b and 39b, which is identical in length to the gap 90. Accordingly, a gap 93 is provided between beads 39b and 38c, which are discharged on the third substrate 34c. Gap 93 is identical in length as gap 91. When the substrate 34a moves along the inspection device 30 (see FIGS. 2, 11), firstly bead 38a is detected by means of the heat sensor head. After gap 90, adhesive bead 39a is detected and after gap 91 adhesive bead 38b is detected. In case the controller, provided in the control box 26 of the heat sensor 43, receives the discharge signal of the control unit of the applicator head 1, detection of the adhesive pattern 37a and also in comparison of the detected adhesive pattern 37a with the desired adhesive pattern can directly be started based on the discharge signal.

In a learning mode, the controller analyzes the detected adhesive pattern 37a for a recurrent pattern and sets the recurrent pattern as the desired pattern. The controller acts in such a case as follows: After bead 39a has been detected, it is compared with bead 38a and the controller analyzes that bead 39a is not identical to bead 38a. After detection of bead 39a, gap 91 is detected and then again bead 38b is detected. After detection of bead 38b, the controller analyzes that bead 38b is congruent with bead 38a. After bead 38b, gap 92 is detected and the controller analyzes that gap 92 is congruent to gap 90. The controller now expects that after this gap 92 a bead would follow that would be substantially identical to bead 39a. After detection of bead 39b this assumption can be verified. Bead 39b is again followed by gap 93 which is congruent to gap 91 and therefore a recurrent pattern has been identified. After detection of gap 93, thus with the start of bead 38c, the controller sets the detected adhesive pattern 37a as the desired adhesive pattern and thus starting from substrate 34c on, automatic detection and comparing of the detected adhesive pattern with the desired adhesive pattern, which is the recurrent pattern in this case, can be started. It can be provided that before a detected recurrent pattern is set as the desired pattern, one or more repetitions of the pattern must be detected. It can for example be provided that one repetition of a detected recurrent pattern is necessary. In this case, the automatic comparison between the detected pattern and the desired adhesive pattern can be started after substrate 34c, thus with a substrate 34d, which follows substrate 34c (which however is not shown in FIG. 17a).

In FIGS. 17b and 17c, different alternatives of adhesive patterns 37b, 37c are shown. Regarding these two patterns 37b, 37c, the same as explained above with regard to pattern 37a is applicable. Pattern 37b consists of three adhesive beads 38a, 39a, 40a which are spaced by gaps, which are not shown with reference signs in FIGS. 17b and 17c. Even though the adhesive pattern 37b, 37c shown in FIGS. 17b and 17c are more complex than adhesive pattern 37a of FIG. 17a, the same method of detecting and analyzing the adhesive pattern 37b, 37c can be applied here.

Figure 18A:
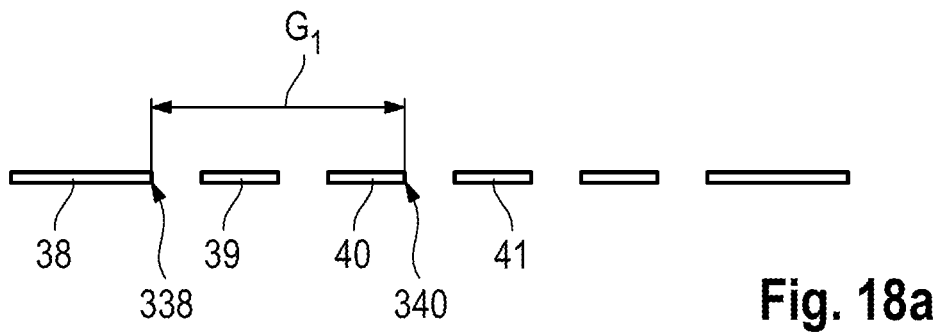
FIGS. 18a-18b illustrate a max gap measurement.
Figure 18B:
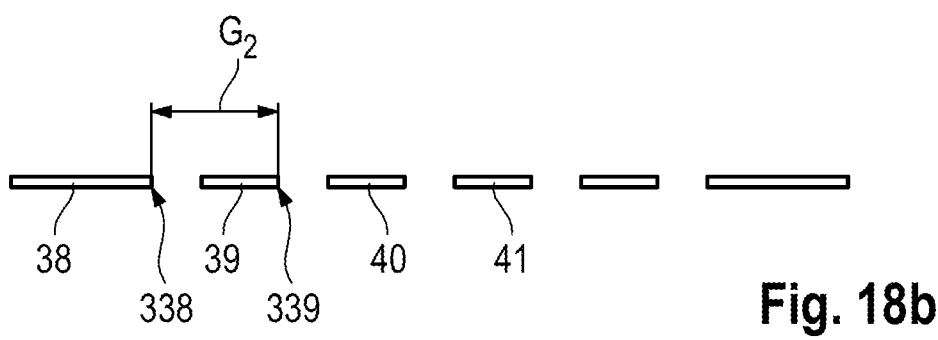

In FIGS. 18a and 18b schematically two adhesive patterns comprising adhesive beads 38, 39, 40, 41 are shown. While FIG. 18a illustrates a high tolerance for a maximum gap G1, FIG. 18b shows a low tolerance for the maximum gap G2. When applying the high tolerance as shown in FIG. 18a, the distance between the trailing edge 338 of the first bead 38 and the trailing edge 340 of the third bead 40 is measured. Thus, a pattern is within tolerances, in case the bead 39 is missing and also the leading portion of the bead 40 is missing. As long as the trailing edges 338 and 340 are detected, this pattern will be determined as being within the tolerance G1.

In contrast thereto, FIG. 18b illustrates a low tolerance for the maximum gap G2. In this low tolerance, the trailing edge 338 of the first bead 38 and the trailing edge 339 of the second bead 39 are compared. When the second bead 39 is completely missing, this pattern will not be considered as being congruent with the desired adhesive pattern. However, it is still possible that the leading portion of the bead 39 is missing and the pattern as shown in FIG. 18b will be considered to be within the tolerance, when the trailing edges 338 and 339 are properly detected.

What is claimed is:

1. A method for inspecting an adhesive pattern that is on a substrate, the method comprising:
receiving a discharge signal for a first time or a change in the discharge signal;
determining, using a controller, a desired adhesive pattern to be applied to the substrate based on the received discharge signal or determining a changed adhesive pattern to be applied to the substrate based on the received change in the discharge signal; and adjusting a tolerance range for the desired adhesive pattern to a predetermined learning range based upon detecting that the discharge signal is received for the first time or detecting the determined changed adhesive pattern.

2. The method of claim 1, wherein the discharge signal includes reference data representing the desired adhesive pattern to be applied to the substrate.

3. The method of claim 2, further comprising discharging, using a nozzle, the adhesive pattern on the substrate, wherein the reference data is data that is received independently of and/or not based on the discharging of the adhesive pattern on the substrate and the adhesive pattern is discharged based on the reference data.

4. The method of claim 3, further comprising detecting, using a sensor arrangement, the discharged adhesive pattern on the substrate; and comparing, using the controller, the detected discharged adhesive pattern with the tolerance range of the desired adhesive pattern.

5. The method of claim 4, wherein detecting the discharged adhesive pattern comprises:

determining an intensity or rate of change in intensity of a characteristic sensed by the sensor arrangement;

determining that the intensity or rate of change in intensity exceeds a threshold; and determining, based on the determination that the intensity or rate of change in intensity exceeds the threshold, that a bead edge is present.

6. The method of claim 5, further comprising scaling the threshold based on a velocity of the substrate or a cooling rate factor.

7. The method of claim 4, wherein detecting the discharged adhesive pattern comprises detecting a width of the discharged adhesive pattern.

8. The method of claim 4, further comprising determining, using a speed sensor of the sensor arrangement, a travelling speed and edge position of said substrate by:

determining an intensity or rate of change in intensity of a characteristic sensed by the speed sensor;

determining that the intensity or rate of change in intensity exceeds a threshold; and determining, based on the determination that the intensity or rate of change in intensity exceeds the threshold, that a substrate edge is present.

9. The method of claim 1, wherein the discharge signal is from a control unit of a nozzle for discharging the adhesive.

10. The method of claim 9, further comprising determining the desired adhesive pattern by calculating a desired bead beginning time and bead end time using at least one predetermined delay value.

11. The method of claim 10, wherein the predetermined delay value comprises:

a valve delay time defining a delay between transmission of the discharge signal and a time when adhesive starts flowing out of the nozzle;

an adhesive fly time defining a time between the adhesive exiting the nozzle and the adhesive contacting the substrate; and/or a travelling time of the substrate defining a time the substrate requires to move from the nozzle to a sensor arrangement.

12. The method of claim 11, wherein the tolerance range comprises a width tolerance based on a travelling speed of the substrate.

13. The method of claim 1, wherein the tolerance range for the desired adhesive pattern is calculated before discharging the adhesive pattern on the substrate.

14. An inspection device for inspecting an adhesive pattern on a substrate, the inspection device comprising:

a controller configured to:

receive a discharge signal;

determine a desired adhesive pattern to be applied to the substrate based on the received discharge signal or determining a changed adhesive pattern to be applied to the substrate based on a received change in the discharge signal; and in case that the controller detects a change in the discharge signal, or that the discharge signal is detected for a first time, set a tolerance range for the desired pattern to a predetermined learning range.

15. The inspection device of claim 14, wherein the controller is configured to receive signals representing the adhesive pattern detected by a sensor arrangement, wherein the discharge signal includes reference data representing the desired adhesive pattern to be applied to the substrate, and wherein the reference data is data that is determined independently of and/or not based on the signals that represent the adhesive pattern detected by the sensor arrangement being received by the controller.

16. The inspection device of claim 15, further comprising at least one sensor arrangement having a heat sensor head for detecting a pattern of an adhesive bead on the substrate.

17. The inspection device of claim 16, further comprising a mask for the heat sensor head for constraining a sensing area of the heat sensor head.

18. The inspection device of claim 16, wherein the sensor arrangement is configured to attach to an applicator head proximate a nozzle that discharges the adhesive pattern on the substrate.

19. The inspection device of claim 14, further comprising a speed detector for detecting an edge of the substrate or a velocity of the substrate.

20. The inspection device of claim 14, wherein the controller is configured to:

receive the discharge signal, from a control unit of a nozzle for discharging adhesive.

* * * * *